(12) United States Patent
Alcaide et al.

(10) Patent No.: US 10,798,453 B2
(45) Date of Patent: Oct. 6, 2020

(54) CONTENT SCHEDULING

(71) Applicant: The DIRECTV Group, Inc., El Segundo, CA (US)

(72) Inventors: Conrad Alcaide, Chino Hills, CA (US); Nooruddin Gheewala, Los Angeles, CA (US); Michael Habif, Long Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/371,172

(22) Filed: Dec. 6, 2016

(65) Prior Publication Data
US 2018/0160184 A1   Jun. 7, 2018

(51) Int. Cl.
*H04N 21/472*   (2011.01)
*H04N 21/438*   (2011.01)
(Continued)

(52) U.S. Cl.
CPC ... *H04N 21/47214* (2013.01); *H04N 21/4334* (2013.01); *H04N 21/4383* (2013.01);
(Continued)

(58) Field of Classification Search
CPC ....... H04N 21/47214; H04N 21/26241; H04N 21/4383; H04N 21/458; H04N 21/4622;
(Continued)

(56) References Cited

U.S. PATENT DOCUMENTS 5,694,176 A    12/1997  Bruette et al.
6,571,390 B1    5/2003  Dunn et al.
(Continued)

FOREIGN PATENT DOCUMENTS

CN    103546808 A    1/2014
KR    20090097585 A    9/2009
(Continued)

OTHER PUBLICATIONS

"TitanTV Help Topics: PVR 101," Titan TV, titantv.com, accessed: Sep. 2016. [http://titantv.com/help.aspx#PVR101Topic]. Retrieved on Sep. 16, 2016, 20 pages.
(Continued)

*Primary Examiner* — Randy A Flynn
(74) *Attorney, Agent, or Firm* — Amin, Turocy & Watson, LLP

(57) ABSTRACT

Presentation of content by a device can be uniquely scheduled by a user in advance with no further interaction with the device by the user. A schedule manager component associated with the device can receive input from a user selecting various items of content for presentation at various times, and, based on the input, can schedule presentation of the various items of content at the various times. The items of content can be content obtained by the device from various sources, including television channels, radio channels, Internet sources, applications, or other devices. To facilitate scheduling of content, the schedule manager component can facilitate presenting a content scheduler interface to the user on the device or another device associated with the device. The schedule manager component can execute the various items of content at the various times for presentation by a display device associated with the device.

20 Claims, 9 Drawing Sheets

(51) Int. Cl.
  *H04N 21/458* (2011.01)
  *H04N 21/462* (2011.01)
  *H04N 21/433* (2011.01)
  *H04N 21/482* (2011.01)

(52) U.S. Cl.
  CPC ....... *H04N 21/458* (2013.01); *H04N 21/4583* (2013.01); *H04N 21/4622* (2013.01); *H04N 21/4821* (2013.01)

(58) Field of Classification Search
  CPC ............. H04N 21/4821; H04N 21/845; H04N 21/4334
  See application file for complete search history.

(56) References Cited

U.S. PATENT DOCUMENTS

| | | | |
|---|---|---|---|
| 7,017,120 B2* | 3/2006 | Shnier | H04N 21/8106 700/94 |
| 7,581,238 B1* | 8/2009 | Taylor | H04N 21/4113 386/291 |
| 7,748,017 B2 | 6/2010 | Kiiskinen | |
| 7,937,450 B2 | 5/2011 | Janik | |
| 8,056,100 B2 | 11/2011 | Herz et al. | |
| 8,595,769 B2 | 11/2013 | Matz | |
| 8,949,900 B2 | 2/2015 | Arte et al. | |
| 9,038,107 B2 | 5/2015 | Khoo et al. | |
| 9,154,847 B2* | 10/2015 | Rothschild | H04N 21/4622 |
| 9,241,136 B2 | 1/2016 | Busse et al. | |
| 9,392,334 B2 | 7/2016 | Cox et al. | |
| 2002/0032019 A1 | 3/2002 | Marks et al. | |
| 2002/0042917 A1* | 4/2002 | Townsend | H04N 21/4181 725/41 |
| 2003/0066085 A1* | 4/2003 | Boyer | H04N 21/26283 725/104 |
| 2003/0203714 A1* | 10/2003 | Videtich | H04H 40/90 455/3.04 |
| 2005/0055715 A1* | 3/2005 | Minnick | H04N 21/4147 725/58 |
| 2007/0067802 A1 | 3/2007 | Carlson et al. | |
| 2007/0072543 A1* | 3/2007 | Paila | H04N 21/4126 455/3.06 |
| 2007/0079345 A1* | 4/2007 | McEnroe | H04N 21/4227 725/106 |
| 2008/0263596 A1* | 10/2008 | Kim | H04N 21/47214 725/40 |
| 2008/0270446 A1* | 10/2008 | Gossweiler | H04N 21/4332 |
| 2008/0271080 A1* | 10/2008 | Gossweiler | H04N 21/254 725/47 |
| 2010/0180297 A1* | 7/2010 | Levine | H04N 21/4312 725/38 |
| 2010/0218129 A1* | 8/2010 | Fahey | H04N 21/47214 715/769 |
| 2011/0131598 A1 | 6/2011 | Park et al. | |
| 2011/0239253 A1* | 9/2011 | West | H04N 21/234363 725/46 |
| 2012/0224834 A1* | 9/2012 | Chen | H04N 21/4334 386/293 |
| 2013/0081085 A1 | 3/2013 | Skelton et al. | |
| 2013/0145399 A1 | 6/2013 | Wodka et al. | |
| 2014/0130096 A1 | 5/2014 | Krishnamurthy | |
| 2014/0282772 A1* | 9/2014 | Chen | H04N 21/26258 725/97 |
| 2015/0039725 A1* | 2/2015 | George | H04L 67/325 709/219 |
| 2015/0268922 A1 | 9/2015 | Defouw | |

FOREIGN PATENT DOCUMENTS

| | | |
|---|---|---|
| WO | 0040026 A1 | 7/2000 |
| WO | 0119084 A1 | 3/2001 |
| WO | 0213521 A1 | 2/2002 |
| WO | 02080552 A2 | 10/2002 |
| WO | 2009053260 A1 | 4/2009 |

OTHER PUBLICATIONS

Wehner, Mike. "How to cut out cable and make your own TV channel," The Daily Dot, dailydot.com, Nov. 23, 2014. [http://www.dailydot.com/debug/customtvchannelguide/]. Retrieved on Sep. 16, 2016, 12 pages.

PC Plus, "How to create your own personalised TV guide," Techradar, techradar.com, Sep. 1, 2012. [http://www.techradar.com/news/television/howtocreateyourownpersonalisedtvguide1093795]. Retrieved on Sep. 16, 2016, 9 pages.

* cited by examiner

CONTENT SCHEDULING

TECHNICAL FIELD

This disclosure relates generally to content communications, e.g., to scheduling of content.

BACKGROUND

Devices, such as set-top boxes (STBs), can be employed to stream, record, store, and/or present (e.g., communicate, play back) content (e.g., video content, audio content) via a television or other display device that can be connected to the device. The device can receive the content from a cable system, the Internet, a satellite system, or another content source. The device also can be employed to time-shift the presentation of certain content. For example, the device can record a television program at the time it is originally scheduled for by a television network, and can play back the television program at a later time, as desired by a user of the device.

The above-described description is merely intended to provide a contextual overview of wireless communication networks, and is not intended to be exhaustive.

DETAILED DESCRIPTION

Figure 1:
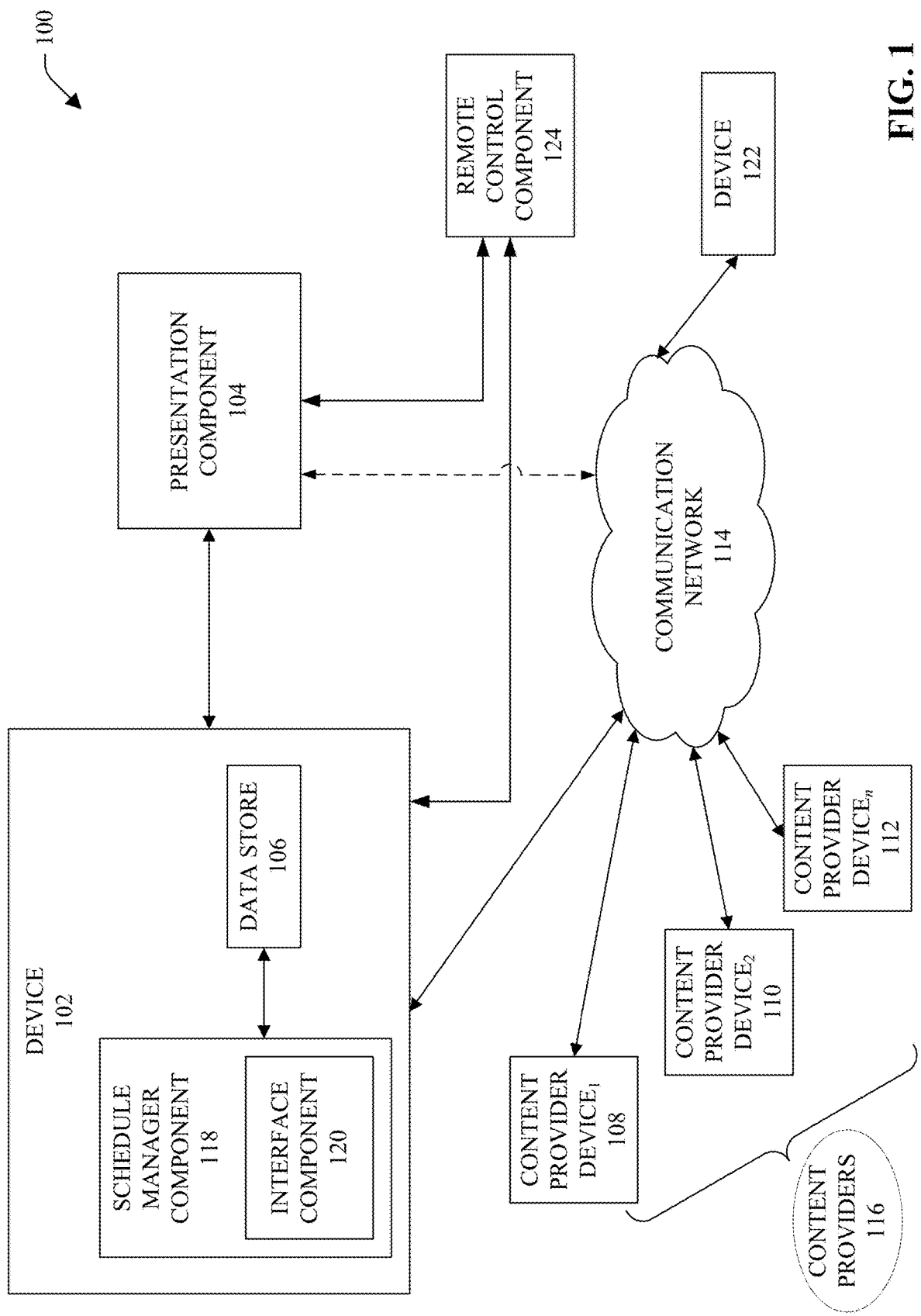
FIG. 1 illustrates a block diagram of an example system that can facilitate generating a content schedule to schedule respective items of content for presentation at respective times, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Devices, such as media devices (e.g., set-top units (STU), set-top boxes (STBs)), can be used to stream, record, store, and/or present (e.g., communicate, display, play back) content (e.g., video content, audio content) via a television or other display device that can be connected to the device. The device typically can receive the content from a cable system, the Internet, a satellite system, or another content source. The device also can be employed to time-shift the presentation of certain content. For example, the device can record a television program at the time it is originally scheduled to be presented by a television network, and can play back the television program at a later time, as desired by a user of the device.

To that end, techniques for uniquely scheduling presentation of content by a device are presented. The presentation of content by the device can be uniquely scheduled by a user in advance with no further interaction with the device by the user. A schedule manager component associated with the device can receive input information from the user, wherein the input information can indicate or relate to selection of various respective items of content (e.g., a television program, a movie from a content provider, video from the Internet or another content provider, music from a music provider) for presentation at respective times. Based at least in part on the input information, the schedule manager component can schedule presentation of the respective items of content at the respective times. The items of content can be content received by the device from various sources, including television channels, radio channels, Internet sources, applications, or other devices. To facilitate scheduling of content, the schedule manager component can facilitate presenting a content scheduler interface to the user via (e.g., on) the device or another device that can be associated with the device or can otherwise access the content scheduler interface (e.g., via a web browser). The schedule manager component can execute the respective items of content at the respective times for presentation by a presentation component (e.g., display device, such as a television) associated with the device.

These and other aspects and embodiments of the disclosed subject matter will now be described with respect to the drawings.

Referring now to the drawings, FIG. 1 illustrates a block diagram of an example system 100 that can facilitate generating a content schedule to schedule respective items of content for presentation at respective times, in accordance with various aspects and embodiments of the disclosed subject matter. The system 100 can comprise a device 102 that can be employed to stream, record, store, and/or present (e.g., communicate, display) content (e.g., video content, audio content) via a presentation (e.g., display) component 104 (e.g., television, video monitor, computer, mobile phone (e.g., smart phone), electronic pad or tablet, electronic notebook, a communication device integrated with a vehicle, a personal digital assistant (PDA), . . . ) that can be connected to the device 102. The device 102 can be or can comprise a media device (e.g., an STB or STU). The presentation of content via the device 102 and the presentation component 104 can be uniquely scheduled by a user in advance (e.g., using a user interface) with no further interaction with the device 102 by the user.

The device 102 can comprise a data store 106 that can store items of content, schedule-related information related to the scheduling of the presentation of respective items of content at respective times, information relating to a user interface that can be provided to the user to facilitate scheduling the presentation of the respective items of content at the respective times, metadata, and/or other information. The items of content, or at least some of the items of content, can be stored in the data store 106, for example, for future presentation of such items of content via the presentation component 104 at desired times.

The device 102 can be associated with (e.g., connected to) a plurality of content provider devices, which can comprise content provider device$_1$ 108, content provider device$_2$ 110, up through content provider device$_n$ 112, wherein n can be virtually any desired number. The plurality of content provider devices (e.g., 108, 110, 112, . . . ) can be associated with the device 102, for example, via a communication network 114, which can comprise a macro communication network and/or a micro or local communication network. The macro communication network can facilitate connecting various devices (e.g., 102, 108, 110, and/or 112, . . . ) to each other via a core network and/or an Internet Protocol (IP)-based network. The micro or local communication network can be or can comprise, for example a local area network (LAN), that can facilitate connecting certain devices (e.g., communication devices) associated with the micro or local communication network to each other and/or to the macro communication network.

Respective devices of the plurality of devices (e.g., 108, 110, 112, . . . ) can be associated with respective content providers of a plurality of content providers 116 that can provide respective items of content to the device 102. The respective content providers of the plurality of content providers 116 can comprise, for example, one or more applications, respective television channels that can be accessed via a cable television service, respective television channels that can be accessed via a satellite television service, respective television channels that can be accessed via a terrestrial television service, one or more video-on-demand services, one or more pay-per-view services, one or more websites, respective radio channels that can be accessed via a cable television service, respective radio channels that can be accessed via a satellite television service, respective radio channels that can be accessed via a terrestrial radio service, or one or more other devices (e.g., a computer, a smart phone, an electronic pad or tablet, an electronic gaming device) that can be associated with the device 102 (e.g., via the micro communication network or the macro communication network).

The system 100 can be employed to allow a user to uniquely schedule content for presentation at desired times without the user having to interact any further with the device 102 after the content has been scheduled. To facilitate scheduling of the presentation of content, the device 102 can comprise (as depicted) or can be associated with (e.g., communicatively connected to) a schedule manager component 118 that can be employed to manage scheduling of content (e.g., media content, such as video content or audio content) for presentation on the presentation component 104.

The schedule manager component 118 can comprise an interface component 120 that can be employed to facilitate generating a user interface that the user can utilize and interact with to schedule content for presentation at desired times. In some implementations, the interface component 120 can generate and/or utilize a schedule application that can be employed to facilitate generating the user interface. The user interface can comprise different screens (e.g., interface screens) that the user can interact with to schedule content. For example, the interface component 120 can generate and facilitate presentation of a first interface screen that can comprise an electronic calendar that presents days of a defined time period (e.g., a week, a month, a year).

Figure 2:
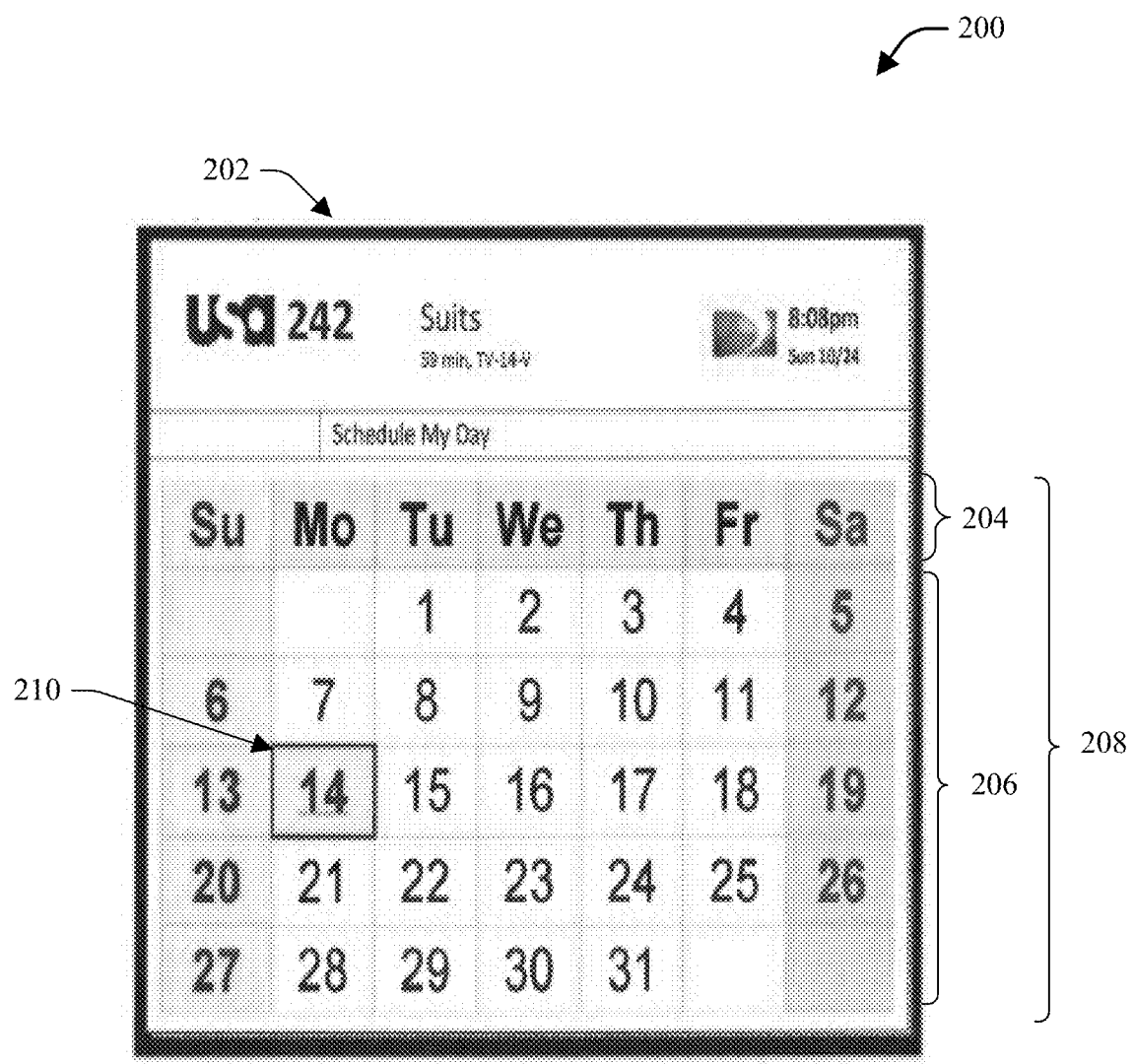
FIG. 2 presents a diagram of an example first interface screen that can comprise an electronic calendar that presents days of a defined time period, in accordance with various aspects and embodiments of the disclosed subject matter.

Referring briefly to FIG. 2 (along with FIG. 1), FIG. 2 presents a diagram of an example first interface screen 200 that can comprise an electronic calendar that presents days of a defined time period (e.g., a month), in accordance with various aspects and embodiments of the disclosed subject matter. The first interface screen 200 can comprise an electronic calendar 202 that can include the days of the week 204 (e.g., Sunday, Monday, Tuesday, . . . ) and the dates 206 (e.g., 1, 2, 3, . . . ) of the defined time period 208 (e.g., a month). The first interface screen 200 also can include other information (e.g., current date, current time, program currently being presented or currently under review and consideration by the user), controls (e.g., buttons), or features. The interface component 120 can facilitate presenting the first interface screen 200 via a display and/or control panel of the device 102, via the presentation component 104 (e.g., by communicating the first interface screen 200 to the presentation component 104), or via another device 122 (e.g., via an application or a web browser accessed using the device 122). The other device 122 can be, for example, a computer, a mobile phone (e.g., a smart phone), an electronic pad or tablet, an electronic gaming device, or other device with communication capabilities and functionality, wherein the other device can be associated with the communication network 114.

In some implementations, the interface component 120 can present, by default, the current defined time period (e.g., the current month, or current week), and can highlight or emphasize the current date of the defined time period by default. The user can manipulate keys, buttons, or controls on the device 102, presentation component 104, a remote control component 124 (e.g., a wireless remote control device) that can be associated with the device 102 or presentation component 104, or the other device 122 to enter input information (e.g., schedule-related information) to facilitate making selections and scheduling content. For example, as depicted in the first interface screen 200, Monday, the 14th of the month (210), has been selected by the user using the keys, buttons, or controls, and the 14th of the month (210) has been highlighted or emphasized (e.g., a thicker border surrounds the 14th of the month (210) as compared to the borders of the other days) in the first interface screen 200, in response to selecting the 14th of the month (210).

In response to selecting a date (e.g., the 14th of the month (210)) on the first interface screen 200, the interface component 120 can generate and present, via the device 102, the presentation component 104, or the other device 122, a second interface screen that can present an electronic content guide that can comprise information relating to content and information relating to incremental time periods (e.g., intraday incremental time periods) of the selected date. For instance, the interface component 120 can facilitate transitioning from the presentation of the first interface screen to presenting the second interface screen, in response to selection of the data on the first interface screen by the user.

Figure 3:
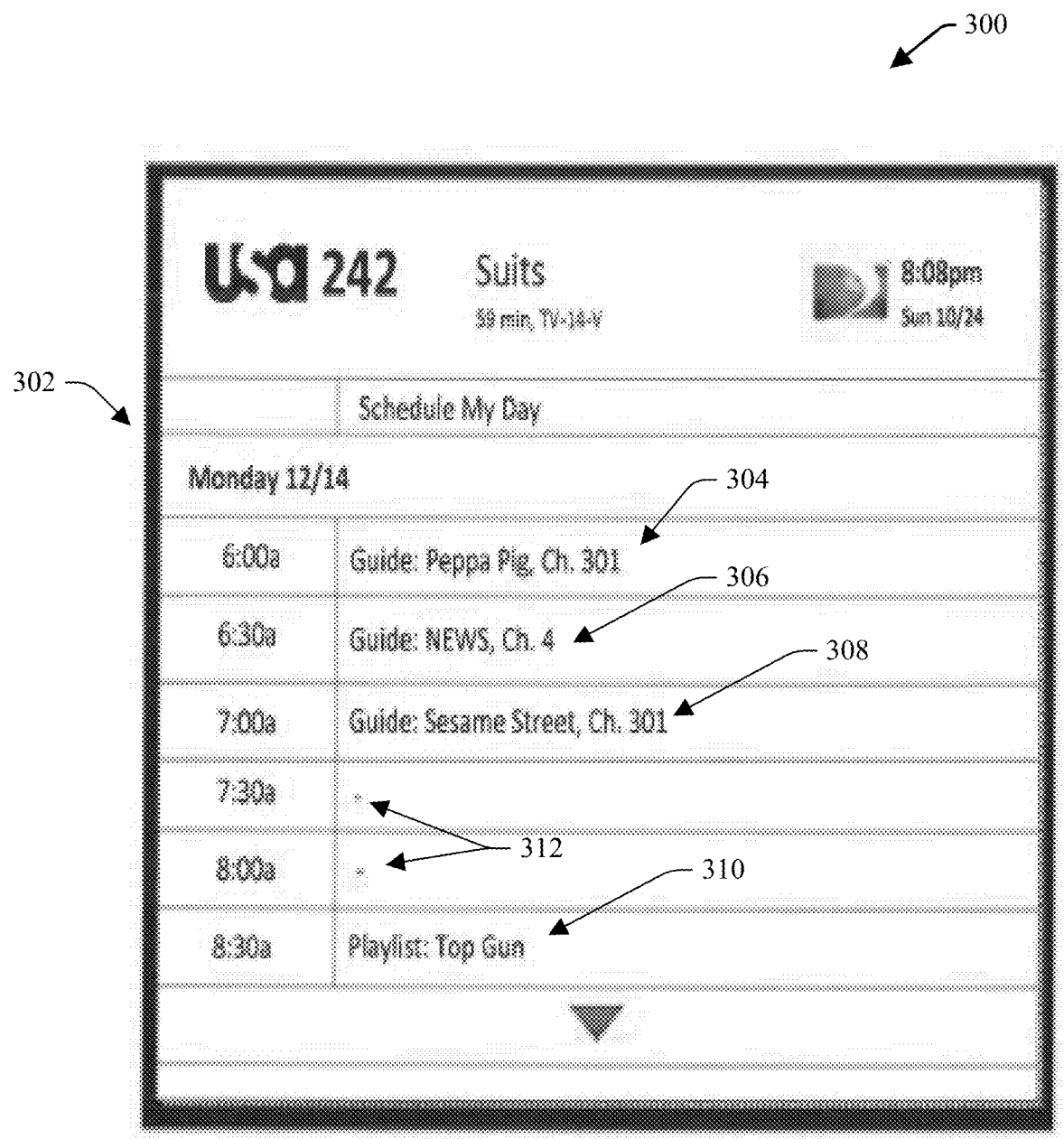
FIG. 3 illustrates a diagram of an example second interface screen that can comprise an electronic content guide that can comprise information relating to content and information relating to incremental time periods of the selected date, in accordance with various aspects and embodiments of the disclosed subject matter.

Turning briefly to FIG. 3 (along with FIG. 1), FIG. 3 illustrates a diagram of an example second interface screen 300 that can comprise an electronic content guide that can comprise information relating to content and information relating to incremental time periods (e.g., hours, minutes) of the selected date, in accordance with various aspects and embodiments of the disclosed subject matter. The electronic content guide 302 can present, by default, the current time (e.g., 6:00 a.m., as depicted on the second interface screen 300) and incremental time periods (e.g., occurring for a defined amount of time (e.g., 2.5 hours, as depicted on the second interface screen 300, or another desired amount of time) thereafter. The incremental time periods presented on the electronic content guide 302 can have virtually any desired level of granularity. For example, the electronic content guide 302 can employ ½-hour incremental time periods, 15-minute incremental time periods, minute incremental time periods, second incremental time periods, as desired. If the user desires to view incremental time periods of the day that are not currently displayed on the second interface screen 300, the user can manipulate a button or control (of or associated with the interface component 120) to scroll through the incremental time periods of the day to display the portion of the incremental time periods of the day that the user desires to view.

The user can manipulate keys, buttons, or controls on the device 102, the presentation component 104, the remote control component 124, or the other device 122 to interact with the electronic content guide 302 and to select and schedule content for presentation at desired times.

For instance, the user can manipulate buttons, controls, and/or commands on or associated with second interface screen 300 (e.g., the electronic content guide 302) to enter schedule-related information, comprising first schedule-related information, which can be received by the interface component 120 of the schedule manager component 118. The first schedule-related information can comprise, for example, the name of the first content, the first time (e.g., a first date and time) that the first content is to be presented, a source of the content (e.g. a content provider 116 and/or associated application, communication channel, website, device, etc., that can provide the first content), a date and time that the first content is first available to be accessed, and/or other information relating to the first content.

In response to the first schedule-related information, the schedule manager component 118 can schedule the first content for presentation at the first time via the presentation component 104 (or another desired device(s) (e.g., device 122) associated with the device 102), wherein the scheduling of the first content can be shown in the content schedule in the electronic content guide 302. At least a portion of the first schedule-related information (e.g., name of the first content, the first time the first content is to be presented, the length (e.g., start time, end time) of presentation of the first content, the source of the first content) can be displayed in the content schedule via the user interface (e.g., second interface screen 300). For example, as illustrated on the second interface screen 300, the electronic content guide 302 can show that the television program "Peppa Pig" on channel 301 is scheduled for presentation at 6:00 a.m. on Monday the 14$^{th}$ (304).

It is noted that the date and time that particular content is to be presented can be the same as or different than the date and time that the particular content is first available to be accessed. For example, the particular content (e.g., a television program) first may be available to be accessed at a particular date and time (e.g., the date and time the television program is regularly scheduled for presentation by the television channel), whereas the user may desire to have the particular content presented on the presentation device at a different (e.g., a later) date and time. The schedule manager component 118 can manage operations of the device 102 to have the device 102 access (e.g., from a device of the content provider 116), record (e.g., store in the data store 106) the particular content on the particular date and time the particular content is first available to be accessed, or can access, record the particular content on another date and time after the date and time the particular content is first available to be accessed, but before the date and time the particular content is to be presented, or can access and stream the particular content at the date and time the particular content is to be presented.

As desired, the user can manipulate the buttons, controls, and/or commands on or associated with second interface screen 300 (e.g., the electronic content guide 302) to enter second schedule-related information in connection with schedule requests to schedule content that can be received by the interface component 120. The second schedule-related information can comprise, for example, the name of the second content, the second time (e.g., a second date and time) that the second content is to be presented, a source of the second content, a date and time that the second content is first available to be accessed, and/or other information relating to the second content. The schedule manager component 118 can receive the second schedule-related information provided by the user.

In response to the second schedule-related information, the schedule manager component 118 can modify or update the content schedule in the electronic content guide 302 to schedule the second content for presentation at the second time, based at least in part on the second schedule-related information. At least a portion of the second schedule-related information (e.g., name of the second content, the second time the second content is to be presented, the length (e.g., start time, end time) of presentation of the second content, the source of the second content) can be displayed in the content schedule via the user interface (e.g., second interface screen 300). For example, as illustrated on the second interface screen 300, the electronic content guide 302 can show that a "NEWS" program on channel 4 is scheduled for presentation at 6:30 a.m. on Monday the 14$^{th}$ (306).

As desired, the user can use the interface screens provided by the interface component 120 to schedule the presentation of other content at other respective times (e.g., third content (e.g., "Sesame Street" on channel 301 at 7:00 a.m. on Monday the 14$^{th}$ (308)), fourth content (e.g., the movie "Top Gun" provided by the content provider Playlist, at 8:30 a.m. on Monday the 14$^{th}$ (310)) on that day or a different day(s). In some implementations, the interface component 120 can generate and provide one or more other interface screens (e.g., a third interface screen, a fourth interface screen, . . . ) that can comprise respective features that can facilitate desirable scheduling of content at respective times.

For example, the interface component 120 can generate a third interface screen that can comprise respective media-content information relating to respective items of content (e.g., media content). The interface component 120 can facilitate transitioning from the presentation of one interface screen (e.g., first interface screen or second interface screen) to presenting the third interface screen, in response to selection, by the user, of a button or control for selecting the third interface screen that can be on the one interface screen. For instance, the third interface screen can provide more detailed information regarding content than is provided by the second interface screen. Such detailed information can comprise, for example, a summary or description of the content, a preview of the content, names of actors or artists who are associated with the content, a performance length of the content, or a source of the content (e.g., an application (e.g., an application (e.g., a Pandora application, a YouTube application, a Hulu application, a Netflix application . . . ), a television or radio channel (e.g., channel 3, channel 4, . . . ; NBC, ABC, Turner Classic Movies, . . . ), media-on-demand (e.g., video-on-demand), a pay-per-view service, a website address, a device name (e.g., Bob's media player, Jill's electronic tablet). The detailed information also can comprise information relating to suggested content for the user to consider viewing. For instance, with regard to particular content, the schedule manager component 118 can facilitate providing suggested content, and associated information (e.g., content source, date/time of presentation, . . . ), on the third interface screen, wherein the suggested content can be related to the particular content, and wherein the suggested content can be other content that can be of the same genre (e.g., with regard to video content: comedy, mystery, action, drama, . . . ; with regard to music content: rock, country, disco, rap, . . . ) as the particular content, can include a same actor or artist as the particular content, can be of the same era (e.g., 1970s, 1980s, 1990s, . . . ) as the particular content, or can have one or more other characteristics (e.g., nominated for same or similar award) in common with the particular content. The user can decide whether or not to schedule any of the suggested content, using the third interface screen and/or another interface screen (e.g., the first interface screen or the second interface screen).

If a user decides not to schedule the presentation of content at a particular time, the interface component 120 can leave that particular incremental time period blank or can insert a dash 312 (as depicted in the second interface screen 300 for 7:30 a.m.-8:00 a.m. and 8:00 a.m.-8:30 a.m.) in that particular incremental time period. With regard to any particular incremental time period in the content schedule where no content has been scheduled for presentation, the schedule manager component 118 can manage the operation of the device 102 to have the device 102 operate in a default content presentation state. The default content presentation state can be, for example, to continue to provide (e.g., communicate, stream, present) content that is on a same channel or from a same content source as the last scheduled content source (e.g., if the last content source is channel 301 during the period of 7:00 a.m.-7:30 a.m., the schedule manager component 118 can have the device 102 continue to provide content from channel 301 from 7:30 a.m. until the time of the next user-scheduled content in the content schedule), switch the device 102 to a default or random channel or content source, cease presentation of content (e.g., enter a sleep mode). The type of default content presentation state can be selected based at least in part on a preference of the user, wherein the user can enter a preference for the type of default presentation state and other desired user preferences via the interface screens provided to the user by the interface component 120.

When the user is scheduling content for presentation via the interface component 120, the schedule manager component 118 also can provide the user with an option to make all or part of a content schedule reoccurring on a regular periodic basis (e.g., every day, same day each week) or on an irregular basis for a desired period of time (e.g., one month, three months, six months, or other desired period of time). For example, if a television program is provided by a television channel once per week on Wednesdays at 9:00 p.m., the user can select a button or control via an interface screen provided by the interface component 120 to make the presentation of the television program reoccurring on a definite or indefinite basis (e.g., for a desired period of time or for an indefinite time until the user specified otherwise or until the television program no longer airs). In response, the schedule manager component 118 can add the television program to the content schedule to schedule presentation of the television program on a reoccurring basis every Wednesday at 9:00 p.m. (or at another desired time (e.g., every Thursday at 7:00 p.m.) that can be specified by the user).

There can be instances (e.g., when scheduling content to be presented on a reoccurring basis, or when the user otherwise attempts to schedule content for a time where other content is already scheduled) where there can be a scheduling conflict. For example, the user can schedule a television presentation of a baseball game for a particular date and time via an interface screen(s) of the interface component 120, and subsequently, the user attempts to schedule other content (e.g., a television sitcom program) at the particular date and time of the presentation of the baseball game (e.g., by attempting to select the television sitcom program for presentation on a reoccurring basis that happens to include presentation at the particular date and time, or by otherwise attempting to schedule it for that particular date and time without being aware that the presentation of the baseball game is already scheduled for that particular date and time).

The schedule manager component 118 also can search for presentation dates and times of content (e.g., content (e.g., television program) scheduled to be presented on a reoccurring basis). For instance, a user may desire to schedule content for presentation on a reoccurring basis for an extended defined or undefined (e.g., indefinite) period of time. However, the television channel that presents such content may only have provided program scheduling information for such content for a relatively short period of time (e.g., the next four weeks) and/or the electronic content guide 302 may only have program scheduling information such content for that relatively short period of time. As another example, programming times for presentation of content by a content source of a content provider 116 can sometimes change. For instance, a television station, which had a television program scheduled for Tuesdays at 8:00 p.m., may change its programming schedule to move that television program to Mondays at 8:30 p.m.

To facilitate desirable scheduling of content, the schedule manager component 118 can periodically or dynamically search one or more sources (e.g., updates to the electronic content guide, a website on the Internet) for new or updated program scheduling information indicating future presentation dates and times of such content. In response to finding or identifying new or updated program scheduling information indicating future presentation dates and times of such content, the schedule manager component 118 can update the content schedule to schedule the future presentations of such content at the newly identified presentation dates and times. Additionally or alternatively, the schedule manager component 118 can notify the user, for example, via an interface screen associated with the interface component 120, of the newly identified presentation dates and times (e.g., a change in programming times for a television program), can inquire as to whether or not the user desires to schedule the content at the newly identified presentation dates and times, and can update (or not update) the content schedule, in accordance with the scheduling instructions received from the user via an interface screen associated with the interface component 120.

The schedule manager component 118 also can monitor the content schedule, schedule requests of the user, updates of the content schedule, updates of program scheduling information associated with content, and can detect when there is a scheduling conflict between two or more schedule requests. Via an interface screen of the interface component 120, the schedule manager component 118 can notify the user (e.g., via a conflict notification message) that there is a scheduling conflict between two or more schedule requests to facilitate resolving the scheduling conflict. The schedule manager component 118, via an interface screen of the interface component 120, can inquire as to whether the user wants to override one of the schedule requests, time-shift one of the schedule requests to a different presentation time (e.g., maintain scheduling of presentation of the baseball game at the scheduled date and time, and time-shift the presentation of the sitcom program to the following day at a desired time of day), or cancel one of the schedule requests. For example, in response to the user electing to time-shift one of the schedule requests, the schedule manager component 118 can facilitate presenting the content for the first schedule request (which was maintained as is) at its scheduled date and time, and also can facilitate accessing and recording (e.g., storing in the data store 106) the other content associated with the second schedule request. The schedule manager component 118 can facilitate presenting, via the presentation component 104 (or another device (e.g., device 122)), the other content at the time-shifted date and time that was specified by the user. In this way, the schedule manager component 118 can thereby resolve the scheduling conflict between presentation of respective content.

After the content schedule of the user is created or updated, the schedule manager component 118 can store the content schedule (e.g., information relating to the content schedule) in the data store 106. The schedule manager component 118 can access (e.g., from the data store 106) and monitor the content schedule to facilitate retrieving, tuning to (e.g., automatically tuning to), and/or providing respective items of content at respective times from respective content sources associated with respective content providers 116, in accordance with the scheduling of the respective items of content in the content schedule.

Based at least in part on the monitoring of the content schedule, in response to detecting, in the content schedule, an item of content that is to be presented at or near a current time, as scheduled, the schedule manager component 118 can execute the content schedule to facilitate providing (e.g., communicating) the item of content at the current time to the presentation component 104 (or other desired device (e.g., device 122)) for presentation by the presentation component 104 (or other desired device (e.g., device 122)). For example, with regard to the first content scheduled to be presented at the first time, as specified in the content schedule, at the first time (e.g., first date and time), the schedule manager component 118 can execute the content schedule (e.g., execute the first scheduling item relating to the first content in the content schedule) to facilitate presenting the first content. The schedule manager component 118 can access the first content from a first source (e.g., the device 108 associated with a first content provider 116) prior to the first time, and can store the first content in the data store 106, wherein the schedule manager component 118 can access the first content in the data store 106 at the first time; or, alternatively, the schedule manager component 118 can access the first content from the first source at the first time (e.g., by automatically tuning to the television or radio channel that is presenting the first content, or accessing a website from which the first content can be obtained, or accessing an application or device from which the first content can be obtained). The schedule manager component 118 can facilitate communication of the first content from the device 102 to the presentation component 104 (or other desired device (e.g., the device 122)) at the first time to facilitate presentation of the first content by the presentation component 104 or other desired device at the first time.

With regard to the second content scheduled to be presented at the second time, in accordance with the content schedule, at the second time (e.g., the second date and time), the schedule manager component 118 can execute the content schedule (e.g., execute the second scheduling item relating to the second content in the content schedule) to facilitate presenting the second content. The schedule manager component 118 can access the second content from a second source (e.g., the device 110 associated with a second content provider 116) prior to the second time, and can store the second content in the data store 106, wherein the schedule manager component 118 can access the second content in the data store 106 at the second time; or, alternatively, the schedule manager component 118 can access the second content from the second source at the second time (e.g., by automatically tuning (e.g., automatically switching the channel tuning) to the television or radio channel that is presenting the second content, or accessing a website from which the second content can be obtained, or accessing an application or device from which the second content can be obtained). The schedule manager component 118 can facilitate communication of the second content from the device 102 to the presentation component 104 (or other desired device (e.g., the device 122)) at the second time to facilitate presentation of the second content by the presentation component 104 or other desired device at the second time.

In some implementations, the schedule manager component 118 of or associated with the device 102 can receive schedule requests from another device, such as the device 122 (e.g., communication device, such as a mobile phone, an electronic tablet, a computer), via a message sent (e.g., transmitted) from the device 122 to the schedule manager component 118 (e.g., via the communication network 114). The message (e.g., electronic message), which can comprise a schedule request and/or scheduling-related information relating to scheduling of content for presentation at a desired time, can be, for example, a text message (e.g., SMS, MMS, iMessage) sent from the device 122 to the schedule manager component 118, or an email message sent from an email address associated with the user to an email address associated with the schedule manager component 118.

The schedule manager component 118 can analyze and parse the information in the message to identify the schedule-related information (e.g., identify the name of the content, the source of the content, the date and time the content is to be presented, . . . ). The schedule manager component 118 can create or modify (e.g., update) the content schedule associated with the user, based at least in part on the schedule-related information contained in the message, to schedule the content identified in the schedule-related information for presentation at the specified date and time. For example, the user can use the device 122 to generate a message that says, "Schedule the TV show Big Bang Theory on channel 8 for Thursday at 9 p.m.," and the device 122 can send the message to the schedule manager component 118 (e.g., to the device 102 associated with the schedule manager component 118). The schedule manager component 118 can analyze and parse the information in the message, and can identify or determine that the user desires to schedule the television show "Big Bang Theory," which is provided by channel 8, for presentation this Thursday at 9:00 p.m. The schedule manager component 118 can update the content schedule of the user to schedule the show "Big Bang Theory," which is provided by channel 8, for presentation this Thursday at 9:00 p.m. (e.g., via the presentation component 104).

In certain implementations, to facilitate ensuring accuracy in the scheduling of content for presentation, the schedule manager component 118 can generate and send back a message (e.g., verification message) to the device 122 to verify information (e.g., scheduling information) regarding the content the user is attempting to schedule. For example, the schedule manager component 118 can generate a message asking the user to verify that the user desired to schedule the show "Big Bang Theory," provided by channel 8, for presentation this Thursday at 9:00 p.m.

This verification message can be useful, for instance, if the original schedule request message of the user did not include all of the pertinent scheduling information (e.g., the schedule request message only said, "schedule Big Bang Theory for Thursday). If all of the pertinent scheduling information is not contained in the schedule request message, the schedule manager component 118 can determine or identify the missing scheduling information based at least in part on the partial scheduling information contained in the schedule request message. For example, the schedule manager component 118, if the television channel of the television show and the broadcast time of the television show is not included in the schedule request message, the schedule manager component 118 can determine the television channel and the broadcast time of the television show by searching a television guide (e.g., the electronic content guide) or a website, or other data source, to determine the television channel and the broadcast time of the television show based at least in part on identifying that the television show is "Big Bang Theory" and it is to be presented on Thursday.

If the scheduling of content is verified and/or once the content schedule is updated based on the message received from the device 122, the schedule manager component 118 can send, to the device 122, a confirmation message that can confirm that the content has been scheduled at the desired date and time to notify the user that the scheduling of the content was successful.

In some implementations, the interface component 120 of the schedule manager component 118 can generate and provide a message template (e.g., a text message template or email template) that can be used on the device 122 by the user to create a schedule request via the message. For instance, the message template can comprise fields or locations including a field or location in the message to insert the name of the content, a field or location in the message to insert the channel or source of the content, a field or location in the message to insert the date and time for presentation of the content, and/or a field or location in the message to insert an authentication credential (e.g., password). For example, the message template can be structured as follows:

Content name:
Channel:
Date/time:
Password:

wherein a user can enter the appropriate information in proximity to (after and next to) the respective information requests or field names (e.g., content name, channel, date/time, password).

With regard to the "Big Bang Theory" example, the user, in the schedule request message via the device 122, can enter "Big Bang Theory" after "Content name:," can enter "8" after "Channel:," can enter "Thursday at 9 p.m." after "Date/time:," and/or can enter the "[user's password]" after "Password:" (or may leave one or more fields or locations blank). The schedule manager component 118 can receive the schedule request message from the device 122, and can identify the respective fields (e.g., content name, channel, date/time, and/or password) and, based at least in part on the identified respective fields, also can identify the respective items of scheduling information associated with (e.g., Big Bang Theory, 8, Thursday at 9 p.m., and/or [user's password]) located after or in proximity to those respective fields in the schedule request message.

As disclosed, there can be instances where there is a scheduling conflict between two items of content that a user desires to schedule. If the user attempts to schedule content for presentation at a certain date and time via a schedule request message sent from the device 122 to the schedule manager component 118 (via the device 102), the user may not know that the user already had other content scheduled at that certain date and time. If there is a schedule conflict, the schedule manager component 118 can detect the schedule conflict based at least in part on the scheduling-related information contained in the message and the information in the content schedule. In response to detecting the schedule conflict, the schedule manager component 118 can generate a schedule conflict message and can send the schedule conflict message to the device 122 to notify the user that there is a schedule conflict associated with the content the user was attempting to schedule via the schedule request message. The schedule conflict message can inquire as to whether the user desires to cancel the schedule request, override the scheduling of the other content that was already scheduled for that certain date and time, or time-shift the presentation of the other content or the content the user is attempting to schedule to a different date and time. Based at least in part on (e.g., in accordance with) the response received from the device 122 of the user with regard to the schedule conflict message, the schedule manager component 118 can take an appropriate scheduling action (e.g., cancel the schedule request, override the scheduling of the other content, or time-shift the presentation of the other content or the content associated with the schedule request).

By enabling users to create unique content schedules for the presentation of respective items of content at respective times, the system 100 (comprising the schedule manager component 118) can enhance the user experience with regard to viewing content. For instance, a user can use the schedule manager component 118 to create a content schedule, comprising desired items of content for presentation at desired respective times, wherein the content schedule can be used for scheduling content (e.g., child-appropriate content) for presentation to the user's children, as desired, or can be used to facilitate presenting desired items of content during an event (e.g., a party), or can be used to facilitate presenting desired items of content to customers at a business establishment, such as a restaurant or bar (wherein the user can have the content presented, as desired, all without further interaction with the content schedule or the device 102).

Figure 4:
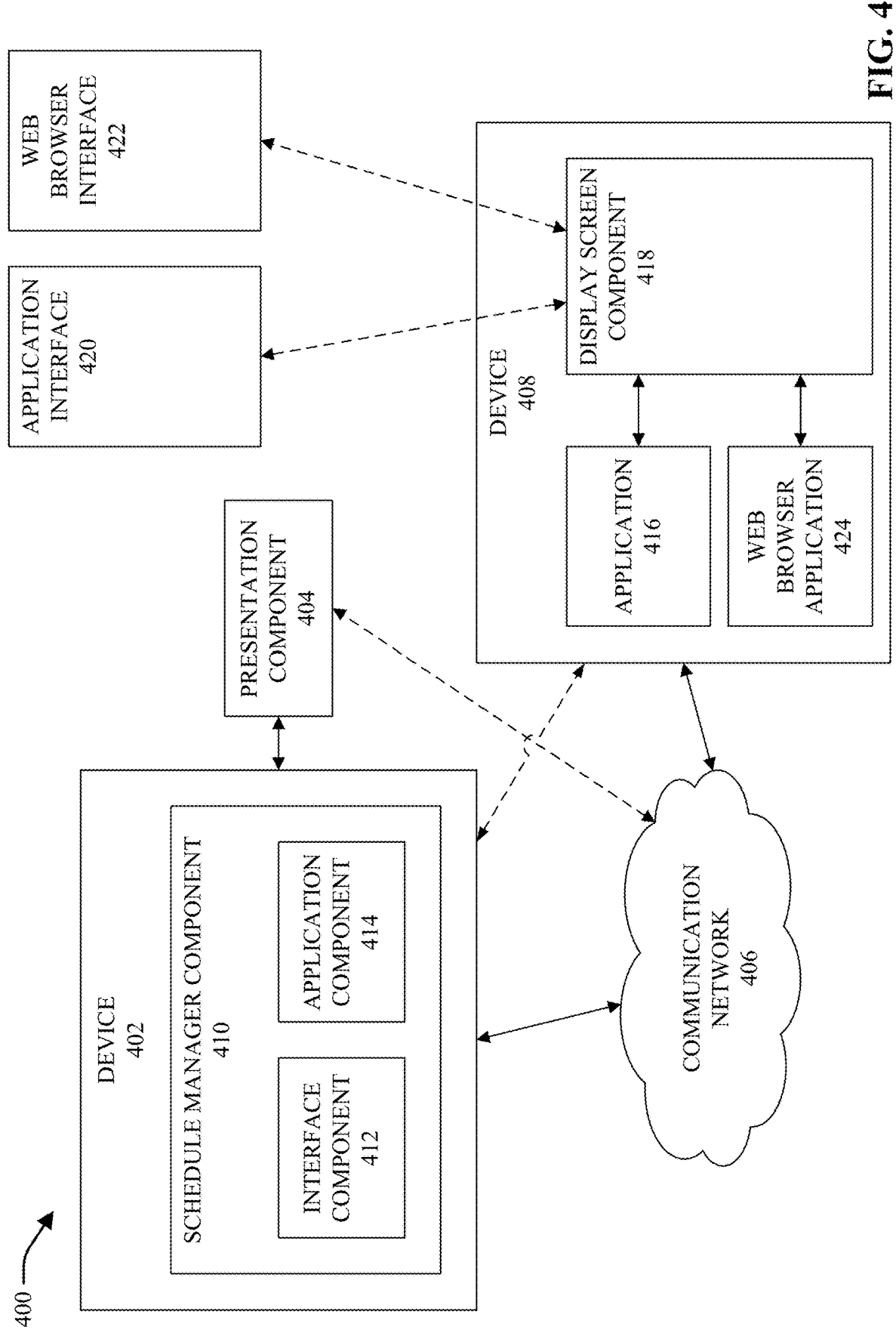
FIG. 4 depicts a block diagram of an example system that can employ an application or web browser to facilitate generating a content schedule to schedule respective items of content for presentation at respective times, in accordance with various aspects and embodiments of the disclosed subject matter.

Turning to FIG. 4, depicted is a block diagram of an example system 400 that can employ an application or web browser to facilitate generating a content schedule to schedule respective items of content for presentation at respective times, in accordance with various aspects and embodiments of the disclosed subject matter. The system 400 can comprise a device 402, which can be a media device (e.g., an STB or STU), that can be employed to stream, record, store, and/or present (e.g., communicate, display) content (e.g., video content, audio content) via a presentation component 404 (e.g., television, video monitor, computer, mobile phone, electronic pad or tablet, a communication device integrated with a vehicle, PDA, . . . ) that can be associated with (e.g., connected to) the device 402.

The system 400 also can comprise a communication network 406, and the device 402 and/or the presentation component 404 can be associated with (e.g., communicatively connected to) the communication network 406 via a wireline (e.g., wired) or wireless communication connection. A communication device 408 (e.g., a mobile phone, computer, electronic notebook, electronic pad or tablet, electronic gaming device, PDA, communication device integrated with a vehicle) also can be associated with (e.g., communicatively connected to) the communication network 406 via a wireline or wireless communication connection.

The device 402, the communication device 408, and/or the presentation component 404 can operate and communicate in a communication network environment. At various times, the communication device 408 (and/or the device 402 and/or the presentation component 404) can be communicatively connected via a wireless communication connection(s) to one or more radio access networks (RANs) (not shown), which can comprise one or more base stations (not shown) to communicatively connect the communication device 408 (and/or the device 402 and/or the presentation component 404) to the communication network 406 to enable the communication device 408 (and/or the device 402 and/or the presentation component 404) to communicate with other communication devices associated with (e.g., communicatively connected to) the communication network 406 in the communication network environment. The RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 406 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; etc. The communication network 406 (e.g., a core network, or a network comprising a core network and/or an IP-based network) can facilitate routing voice and data communications between a communication device(s) (e.g., communication device 408) and other communication devices (e.g., device 402) associated with the communication network 406 in the communication network environment. The communication network 406 also can allocate resources to the communication devices (e.g., communication device 408, device 402, and/or the presentation component 404) or other communication devices in the communication network 406, convert or enforce protocols, establish and enforce quality of service (QOS) for the communication devices, provide applications or services in the communication network 406, translate signals, and/or perform other desired functions to facilitate system interoperability and communication in the communication network 406 (e.g., wireless portion of the communication network 406 or wireline portion of the communication network 406).

The communication network 406 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices (e.g., communication device 408, device 402, and/or the presentation component 404) in the communication network environment.

As a communication device(s) (e.g., communication device 408, device 402, and/or the presentation component 404) is moved through a wireless communication network environment, at various times, the communication device(s) (e.g., communication device 408, device 402, and/or the presentation component 404) can be connected (e.g., wirelessly connected) to one of a plurality of access points (APs) (e.g., macro or cellular AP, femto AP, pico AP, wi-fi AP, wi-max AP, hotspot (e.g., hotspot 1.x, hotspot 2.x, where x is an integer number; communication device (e.g., UE functioning as a mobile hotspot)) that can operate in the wireless communication network environment. An AP (e.g., base station) can serve a specified coverage area to facilitate communication by the communication device(s) (e.g., communication device 408, device 402, and/or the presentation component 404) or other communication devices in the wireless communication network environment. An AP can serve a respective coverage cell (e.g., macrocell, femtocell, picocell, etc.) that can cover a respective specified area, and the AP can service mobile wireless devices, such as the communication device(s) (e.g., communication device 408, device 402, and/or the presentation component 404), located in the respective area covered by the respective cell, where such coverage can be achieved via a wireless link (e.g., uplink (UL), downlink (DL)). When an attachment attempt is successful, the communication device(s) can be served by the AP and incoming voice and data traffic can be paged and routed to the communication device(s) through the AP, and outgoing voice and data traffic from the communication device(s) can be paged and routed through the AP to other communication devices in the communication network environment. In an aspect, the communication device(s) can be connected and can communicate wirelessly using virtually any desired wireless technology, including, for example, cellular, Wi-Fi, Wi-Max, wireless local area networks (WLAN), etc.

In some implementations, the communication device 408 can be connected (e.g., directly connected) with the device 402 (e.g., via a micro communication network or personal area network (PAN)) using, for example, one or more various types of wireless communication technology, such as, for example, Bluetooth technology, Wi-Fi technology, ZigBee technology, near field communication (NFC) technology, etc., to facilitate communicating information (e.g., schedule requests, content schedule information, content scheduling-related messages, content-related information, other information) between the communication device 408 and the device 402.

The device 402 can comprise a schedule manager component 410 and an interface component 412, which can be employed to facilitate generating content schedules and scheduling presentation of content at desired times, as more fully disclosed herein. In accordance with various implementations, the schedule manager component 410 can comprise (as depicted in FIG. 4) or be associated with (e.g., connected to) an application component 414 that can be employed to generate and provide an application 416 (e.g., a content scheduling application) to a communication device (e.g., communication device 408). For instance, the communication device 408 (e.g., as instructed by the user) can download the application 416 from the application component 414 to the communication device 408 or can otherwise obtain and/or access the application 416. The application 416 can operate in conjunction with the schedule manager component 410 and interface component 412 to facilitate generating content schedules and scheduling presentation of content at desired times, as desired by a user of the communication device 408 and the application 416.

The communication device 408 can comprise a display screen component 418 that can be used to view information, content, etc. The display screen component 418 can comprise a touchscreen display or can be associated with a keyboard or keypad that can be used to enter information, including schedule-related information. The application 416, operating in conjunction with the schedule manager component 410 and interface component 412, can be employed to facilitate presenting an application interface 420 on the display screen component 418, wherein the application interface 420 can comprise or facilitate the presentation (e.g., display) of interface screens (e.g., the first interface screen, second interface screen, third interface screen, or interface screens that can be similar to such interface screens) on the display screen component 418.

Using the interface screens presented via the application interface 420 presented on the display screen component 418 of the communication device 408, the user can enter information, such as schedule-related information, via the interface screens to facilitate creating a content schedule to schedule respective items of content for presentation at respective times via the presentation component 404 (or the communication device 408), as more fully disclosed herein. The schedule-related information and/or other information (e.g., user preferences) can be communicated from the communication device 408 to the schedule manager component 410 of or associated with the device 402 via the communication network 406. The schedule manager component 410 can create the content schedule to schedule respective items of content for presentation at respective times based at least in part on the schedule-related information received from the communication device 408.

Additionally or alternatively, the interface component 412 can facilitate presenting (e.g., communicating) interface screens (e.g., the first interface screen, second interface screen, third interface screen, or interface screens that can be similar to such interface screens) on a web browser interface 422 that can be accessed or opened by the communication device 408. For example, the communication device 408 can open a web browser using a web browser application 424. The user can enter information into the web browser to access a website associated with the schedule manager component 410. Via the website, the interface component 412 can facilitate providing (e.g., communicating) the interface screens to the communication device 408 via the communication network 406.

Using the interface screens via the web browser interface 422 presented on the display screen component 418 of the communication device 408 (and associated interfaces provided by the web browser and communication device 408), the user can enter information, such as schedule-related information, via the interface screens (and/or associated interfaces) to facilitate creating a content schedule to schedule respective items of content for presentation at respective times via the presentation component 404 (or the communication device 408), as more fully disclosed herein. The schedule-related information and/or other information (e.g., user preferences) provided via the interface screens on the web browser interface 422 can be communicated from the communication device 408 to the schedule manager component 410 of or associated with the device 402 via the communication network 406. The schedule manager component 410 can create the content schedule to schedule respective items of content for presentation at respective times based at least in part on the schedule-related information received from the communication device 408.

Figure 5:
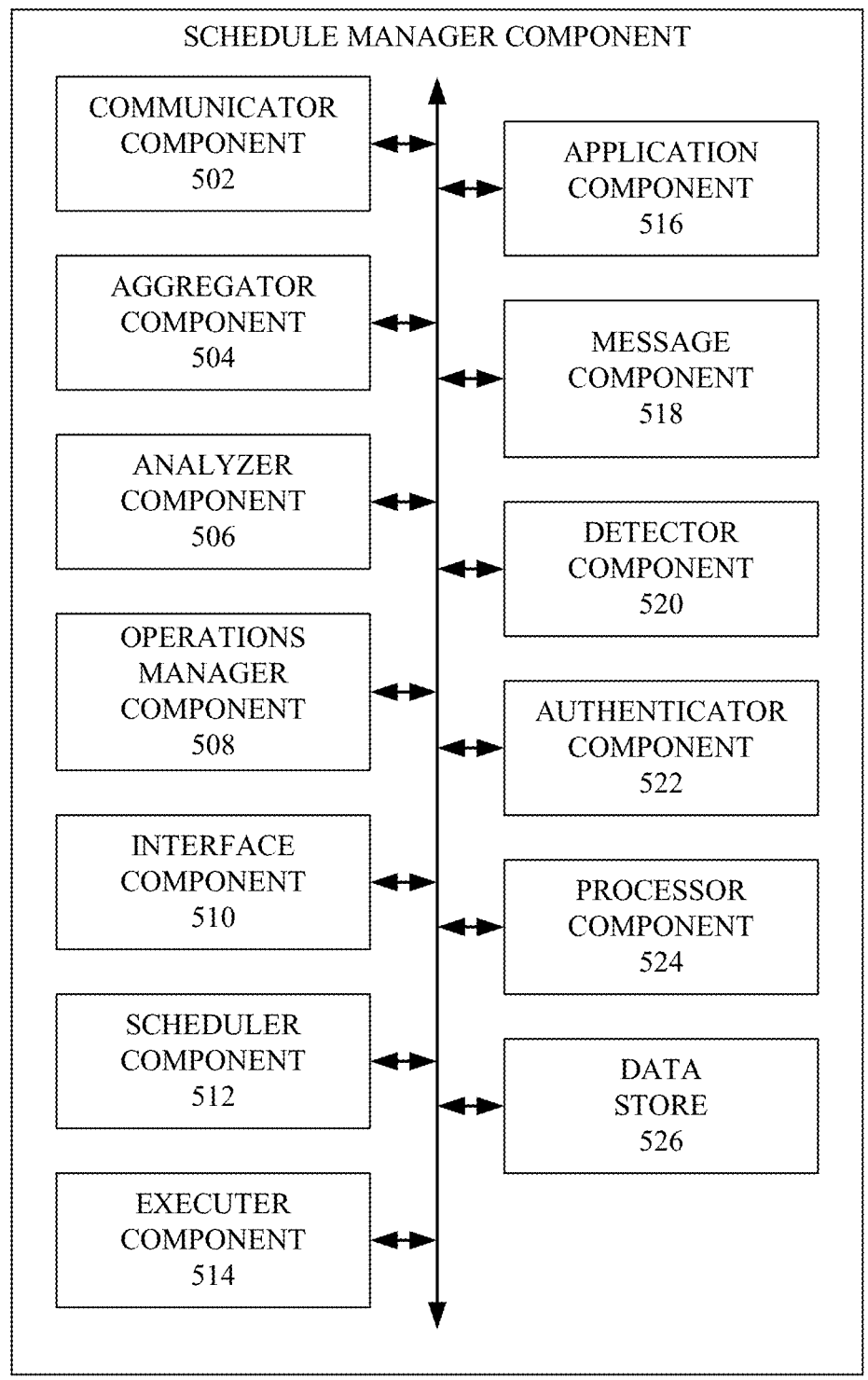
FIG. 5 illustrates a block diagram of an example schedule manager component, in accordance with various aspects and embodiments of the disclosed subject matter.

FIG. 5 illustrates a block diagram of an example schedule manager component 500, in accordance with various aspects and embodiments of the disclosed subject matter. The schedule manager component 500 can be employed to facilitate generating content schedules to schedule respective items of content for presentation at respective times, and executing the content schedules to facilitate presenting the respective items of content at the respective times, based at least in part on the schedule-related information received from a user, as more fully disclosed herein. In accordance with various implementations, all or part of the schedule manager component 500 can reside in a device, such as a media device (e.g., STB or STU). In some implementations, all or part of the schedule manager component 500 can reside in a cloud (e.g., a cloud computing environment).

The schedule manager component 500 can comprise a communicator component 502 that can transmit information from the schedule manager component 500 to another component or device (e.g., presentation component, communication device, devices associated with content providers) and/or can receive information from the other component or device. For instance, to facilitate generating a content schedule for a user, the communicator component 502 can receive schedule-related information from a communication component (e.g., a remote control component) associated with the device or from a communication device associated with the communication network. The communicator component 502 also can receive content from devices associated with content providers, and can communicate such content to the presentation component or communication device associated with the user for presentation by the presentation component or communication device (e.g., in accordance with a content schedule). The communicator component 502 also can communicate information relating to content, an electronic content guide, a content schedule, or other information to a communication device or a presentation device associated with a user.

The schedule manager component 500 also can include an aggregator component 504 that can aggregate data received (e.g., obtained) from various entities (e.g., communicator component 502 or another component(s) of the schedule manager component 500, communication network, an application, a server (e.g., content provider device) or other communication device, processor, data store, etc.). The aggregator component 504 can aggregate or correlate respective items of data (e.g., schedule-related information) based at least in part on type of data (e.g., schedule-related information, content-related data of respective items of content, application-related data, Internet-related data, signaling, messaging data), source of the data, time or date that the data was generated or received, etc., to facilitate analyzing of the data by the analyzer component 506. For example, the aggregator component 504 can aggregate data (e.g., content-related information, schedule-related information) associated with respective communication devices to facilitate generating a content schedule associated with a user, identifying content requested for scheduling in a schedule request and content-related information (e.g., source of the content, desired time of presentation of the content, . . . ), executing the content schedule, receiving the content from content provider devices, presenting (e.g., communicating) the content for presentation, detecting a content scheduling conflict, resolving a scheduling conflict, etc.

The schedule manager component 500 can comprise the analyzer component 506, which can analyze data (e.g., schedule-related information relating to content or a content schedule, content-related information, data contained in messages, metadata) to facilitate generating a content schedule associated with a user, identifying content requested for scheduling in a schedule request and content-related information (e.g., source of the content, desired time of presentation of the content, . . . ), executing the content schedule, receiving the content from content provider devices, presenting (e.g., communicating) the content for presentation, detecting a content scheduling conflict, resolving a scheduling conflict, etc. For example, the analyzer component 506 can analyze and/or parse information (e.g., schedule-related information) in a schedule request to identify the name of the content being requested, the desired time for presentation of the content, the source (e.g., television or radio channel, application, media-on-demand service, website on the Internet, . . . ) of the content, and/or a content schedule associated with the user who sent the schedule request.

In accordance with various implementations, the schedule manager component 500 also can comprise an operations manager component 508, an interface component 510, a scheduler component 512, an executer component 514, an application component 516, a message component 518, a detector component 520, and an authenticator component 522. The respective components (e.g., operations manager component 508, interface component 510, scheduler component 512, executer component 514, application component 516, message component 518, detector component 520, and authenticator component 522) can comprise the respective features and functions, such as more fully described herein (e.g., including as more fully described herein with regard to the schedule manager component).

The operations manager component 508 can control (e.g., manage) operations associated with the schedule manager component 500. For example, the operations manager component 508 can facilitate generating instructions to have components of the schedule manager component 500 perform operations, and can communicate respective instructions to respective components (e.g., communicator component 502, aggregator component 504, analyzer component 506, . . . ) of the schedule manager component 500 to facilitate performance of operations by the respective components of the schedule manager component 500 based at least in part on the instructions, in accordance with defined algorithms (e.g., content scheduling algorithm, schedule conflict detection and resolution algorithm). The operations manager component 508 also can facilitate controlling data flow between the respective components of the schedule manager component 500 and controlling data flow between the schedule manager component 500 and another component(s) or device(s) (e.g., communication device, presentation component, content provider device, device of the communication network) associated with (e.g., connected to) the schedule manager component 500.

The interface component 510 can generate and/or utilize a schedule application that can be employed to facilitate generating a user interface, comprising one or more different interface screens. Using a device or component (e.g., the device (e.g., STB), remote control component, presentation component, communication device), a user can interact with the one or more interface screens to generate a content schedule to schedule the presentation of respective items of content at respective times, view an electronic content guide or content schedule, view information related to respective items of content, view and/or set user preferences related to scheduling content or viewing content, etc. For example, the interface component 510 can generate a first interface screen that can comprise an electronic calendar that presents days of a defined time period (e.g., a month), a second interface screen that can comprise an electronic content guide that can comprise information relating to content and information relating to incremental time periods (e.g., hours, minutes) of the selected date, a third interface screen that can comprise respective media-content information relating to respective items of content (e.g., media content), and/or another interface screen(s).

The interface component 510 also can facilitate adapting or modifying interface screens for use with different devices or applications. For example, the first interface screen, second interface screen, or third interface screen can be respectively adapted for use via a presentation component (e.g., a television) that has one set of characteristics (e.g., display characteristics, such as display screen size and resolution) and a communication device (e.g., mobile phone, electronic pad or tablet) that can have a different set of characteristics (e.g., different display characteristics, such as a relatively smaller display screen size than the display screen size of a television set). As another example, the first interface screen, second interface screen, or third interface screen can be respectively adapted for use via an application (e.g., used with a communication device) or via a web browser.

The interface component 510 can be employed to facilitate receiving information (e.g., schedule requests, schedule-related information, user preference information) from a device or component (e.g., the device, presentation component, remote control component, communication device) associated with the user, and communicating information (e.g., information relating to a content schedule and content) to the device or component associated with the user.

The scheduler component 512 can be employed to facilitate generating or modifying (e.g., updating) a content schedule to schedule respective items of content for presentation (e.g., via the presentation component or communication device) at respective times, based at least in part on schedule-related information received from the user via the device or component. The scheduler component 512 can receive the schedule-related information, and, in conjunction with the analyzer component 506, can analyze the schedule-related information. The scheduler component 512 can create or update the content schedule and scheduling of respective items of content for presentation at respective times, based at least in part on the results of the analysis of the schedule-related information.

The executer component 514 can execute a content schedule to facilitate presenting the respective items of content at the respective times, in accordance with the content schedule associated with user. The executer component 514 can monitor the content schedule to identify an upcoming item of content that is to be presented, can switch (e.g., automatically switch) to a channel or source of the upcoming content and/or can otherwise receive, obtain, or retrieve (e.g., from the data store) the upcoming item of content, and can present (e.g., communicate to the presentation device or communication device) such item of content for presentation to the user at the scheduled time of presentation, in accordance with the content schedule.

The application component 516 can be employed to generate, provide, and/or enable use of one or more applications (e.g., a content scheduling application, a content provider application) that can be used by a device (e.g., STB), another type of communication device (e.g., mobile phone, electronic pad or tablet), or presentation component (e.g., television). For example, a user can use a communication device to download an application from the application component 516 to the communication device or can otherwise obtain and/or access the application (directly or indirectly) from the application component 516. The application can operate in conjunction with the schedule manager component 500 (including the interface component 510) to facilitate generating content schedules and scheduling presentation of items of content at desired times, as desired by the user of the communication device and the application. As another example, the application component 516 can generate, provide, and/or enable use of a content provider application (e.g., Pandora application, YouTube application, Hulu application, Netflix application, . . . ) that can facilitate providing content from a content provider (e.g., a server device of the content provider) to the device for presentation via the presentation component or other communication device.

The message component 518 can facilitate receiving messages from a communication device or other component or device, and sending messages from the schedule manager component 500 to the communication device or other component or device. The messages can be, for example text messages, multimedia messages, or emails. The message component 518 can receive a message from a communication device of a user, wherein the message can comprise a schedule request that can include schedule-related information to schedule certain content for presentation at a desired time. The message component 518 can generate and send (e.g., transmit) various types of messages to a communication device of a user in connection with scheduling of content for presentation. Such messages can include, for example, a verification message that can ask a user to verify that information of a schedule request (as analyzed and interpreted by the schedule manager component 500) is accurate, a content schedule conflict message that can notify the user of a scheduling conflict in the content schedule associated with the user, and/or a confirmation message that can confirm to the user that the content has been scheduled for presentation in the content schedule. The message component 518 also can receive messages from the communication device of the user in response to, for example, the verification message or schedule conflict message, and the schedule manager component 500 can take appropriate action based at least in part on the response(s) of the user to the verification message or schedule conflict message.

The detector component 520 can detect a scheduling conflict between scheduling of two or items of content during a same time period. For instance, when a request to schedule an item of content for presentation at a particular time is received by the schedule manager component 500, the detector component 520 (in conjunction with the analyzer component 506) can analyze other items of content that are scheduled for presentation at respective times in the content schedule associated with the user, and can analyze the schedule-related information, including time of presentation of the item of content associated with the schedule request. The detector component 520 can detect, identify, or determine a conflict or overlap with regard to the time period of presentation of the requested item of content and another time period of another item of content that is already scheduled in the content schedule.

In response to detecting the schedule conflict, the detector component 520 can facilitate notifying the user of the schedule conflict, as the detector component 520 can notify the operations manager component 508, the interface component 510, the scheduler component 512, the application component 516, and/or the message component 518 of the schedule conflict. The operations manager component 508, the interface component 510, the scheduler component 512, the application component 516, and/or the message component 518 can take appropriate action (if any action is needed to be taken by a respective component) in response to detection of the schedule conflict. As some examples, the operations manager component 508 can facilitate controlling operation of the various components of the schedule manager component 500 to notify user of the schedule conflict via the communication device or presentation component associated with the user, the interface component 510 or application component 516 can facilitate notifying the user of the schedule conflict via a schedule conflict message presented via an interface screen, the scheduler component 512 can determine that the requested item of content is not to be scheduled (at least not yet scheduled) in the content schedule (and can await information relating to resolution of the schedule conflict), or the message component 518 can generate and facilitate transmission of a schedule conflict message to the communication device associated with the user.

The authenticator component 522 can employ authentication protocols to facilitate security of data associated with a memory (e.g., a data store) or the device (e.g., STB), in accordance with the disclosed subject matter. For example, the authenticator component 522 can solicit authentication data (e.g., an authentication credential) from an entity (e.g., a user, another device), and, upon the authentication data so solicited, can be employed, individually and/or in conjunction with information acquired and ascertained as a result of biometric modalities employed, to facilitate control access to the memory or the device. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authenticator component 522 can implement one or more machine-implemented techniques to identify an entity by its unique physical and behavioral characteristics and attributes. Biometric modalities that can be employed can include, for example, finger print identification that can scan the corrugated ridges of skin that are non-continuous and form a pattern that can provide distinguishing features to identify an entity, face recognition wherein measurements of key points on an entity's face can provide a unique pattern that can be associated with the entity, and iris recognition that measures from the outer edge towards the pupil the patterns associated with the colored part of the eye—the iris—to detect unique features associated with an entity's iris.

In response to verifying that the received authentication data matches stored authentication data relating to the entity, the authenticator component 522 can grant a set of access rights to the memory or the device, in accordance with access rights that the entity is permitted to have. In response to not being able to verify that the received authentication data matches stored authentication data relating to the entity, the authenticator component 522 can deny access rights to the memory or the device, or can grant limited access rights to the entity, wherein the limited access rights can be access rights that are permitted to be granted to non- or un- authorized entities. The authenticator component 522 also can provide an entity with one or more additional opportunities to provide valid authentication data up to a defined maximum number of authentication attempts.

The schedule manager component 500 can comprise a processor component 524 that can work in conjunction with the other components (e.g., communicator component 502, aggregator component 504, analyzer component 506, operations manager component 508, interface component 510, scheduler component 512, executer component 514, application component 516, message component 518, detector component 520, authenticator component 522, data store 526) to facilitate performing the various functions of the schedule manager component 500. The processor component 524 can employ one or more processors, microprocessors, or controllers that can process data, such as information relating to users, user preferences, content, scheduling content, executing a content schedule, detecting and/or resolving a scheduling conflict, content providers, content sources, the communication network, authentication of users, traffic flows, policies, defined algorithms, protocols, interfaces, tools, and/or other information, to facilitate operation of the schedule manager component 500, as more fully disclosed herein, and control data flow between the schedule manager component 500 and other components (e.g., communication devices, presentation component, remote control component, content provider devices, devices of the communication network, data sources, applications) associated with the schedule manager component 500.

The schedule manager component 500 also can include a data store 526 that can store data structures (e.g., user data, metadata), code structure(s) (e.g., modules, objects, hashes, classes, procedures) or instructions, information relating to users, user preferences, content, scheduling content, executing a content schedule, detecting and/or resolving a scheduling conflict, content providers, content sources, the communication network, authentication of users, traffic flows, policies, defined algorithms, protocols, interfaces, tools, and/or other information, to facilitate controlling operations associated with the schedule manager component 500. In an aspect, the processor component 524 can be functionally coupled (e.g., through a memory bus) to the data store 526 in order to store and retrieve information desired to operate and/or confer functionality, at least in part, to the communicator component 502, aggregator component 504, analyzer component 506, operations manager component 508, interface component 510, scheduler component 512, executer component 514, application component 516, message component 518, detector component 520, authenticator component 522, data store 526, etc., and/or substantially any other operational aspects of the schedule manager component 500.

It is also to be understood and appreciated that cryptographic protocols can be employed to facilitate security of data associated with a memory (e.g., data store) in accordance with the disclosed subject matter. For example, a cryptographic component (e.g., cryptographic engine) can be employed and can facilitate encrypting and/or decrypting data (e.g., content, content schedule, user-related information) to facilitate securing data being written to, stored in, and/or read from the memory. The cryptographic component can provide symmetric cryptographic tools and accelerators (e.g., Twofish, Blowfish, AES, TDES, IDEA, CAST5, RC4, etc.) to ensure that the memory, or at least a specified partition in the memory component, or portions thereof, can only be accessed by those entities authorized and/or authenticated to do so. The cryptographic component can also provide asymmetric cryptographic accelerators and tools (e.g., RSA, Digital Signature Standard (DSS), and the like) to ensure that a specified partition in a memory, or portions thereof, only can be accessed by those entities that are authorized and certified to do so. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in the memory is confined to those entities authorized to gain access.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 6:
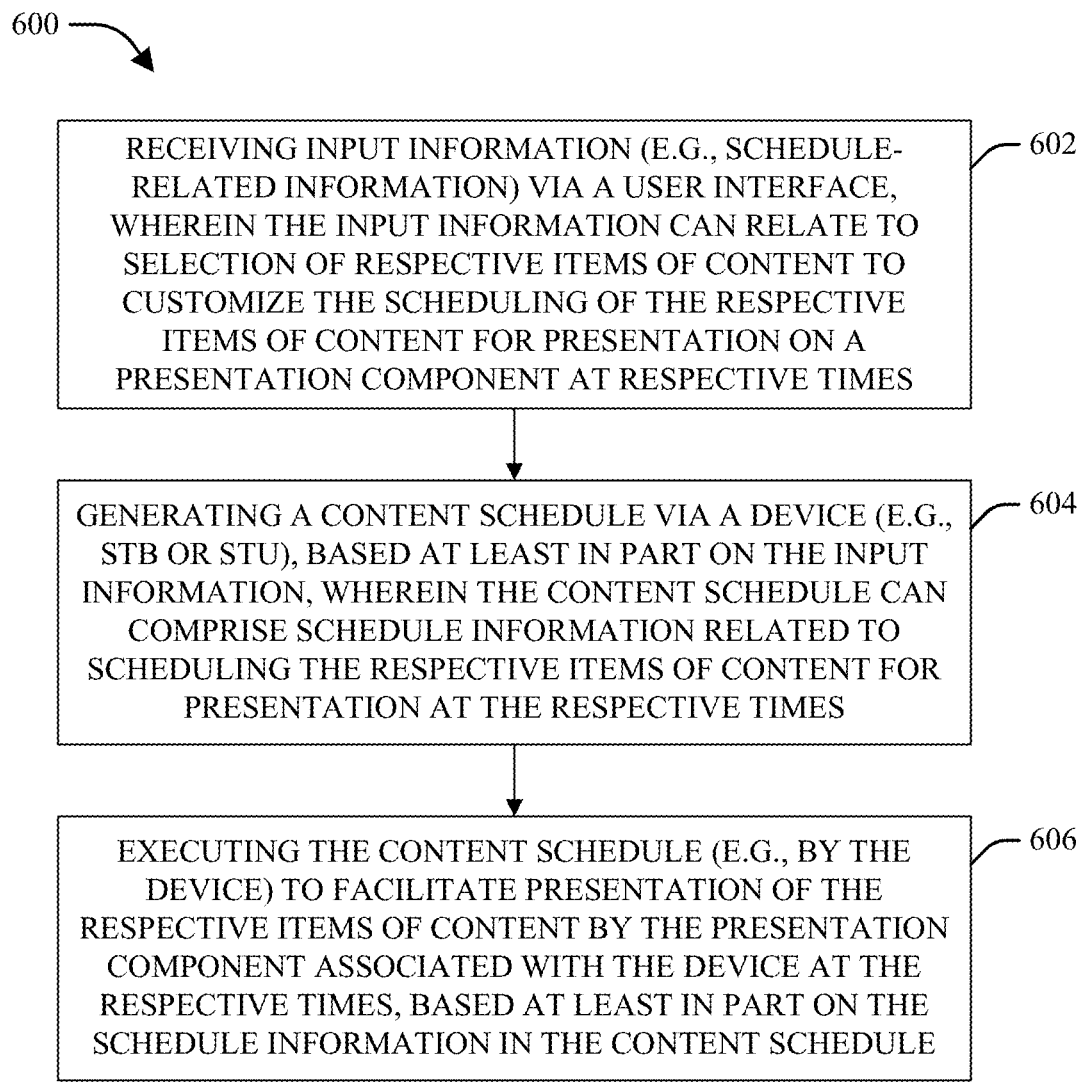
FIG. 6 illustrates a flow diagram of an example method that can be employed to schedule respective items of content for presentation at respective times, in accordance with various aspects and embodiments of the disclosed subject matter.
Figure 7:
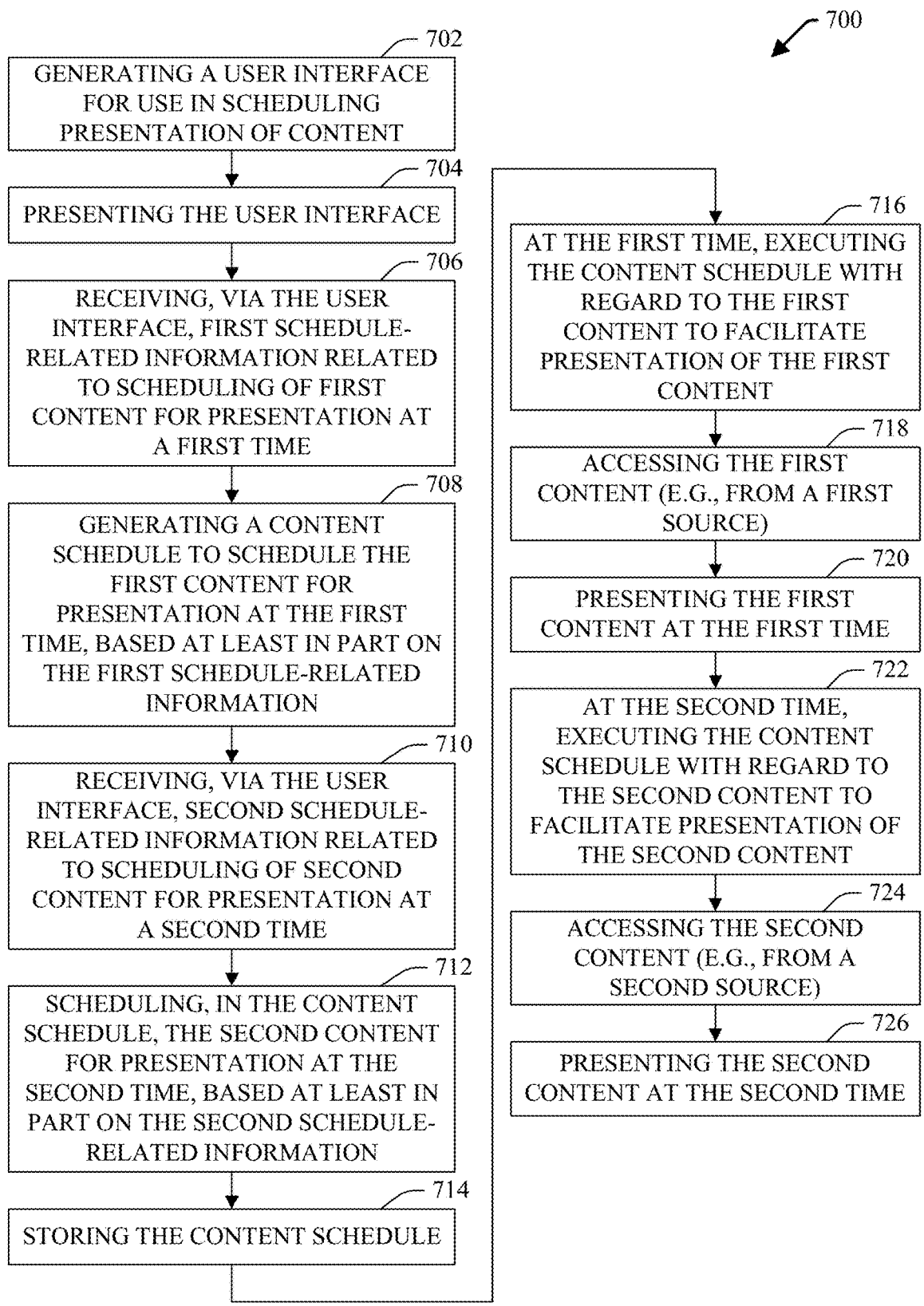
FIG. 7 presents a flow chart of another example method that can be employed to schedule respective items of content for presentation at respective times, in accordance with various aspects and embodiments of the disclosed subject matter.

In view of the example systems and/or devices described herein, example methods that can be implemented in accordance with the disclosed subject matter can be further appreciated with reference to flowcharts in FIGS. 6-7. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 6 illustrates a flow chart of an example method 600 that can be employed to schedule respective items of content for presentation at respective times, in accordance with various aspects and embodiments of the disclosed subject matter. The method 600 can be employed by, for example, a schedule manager component associated with or in (e.g., connected to) a communication network.

At 602, input information (e.g., schedule-related information) can be received via a user interface, wherein the input information can relate to selection of respective items of content to customize the scheduling of the respective items of content for presentation on a presentation component at respective times. A device (e.g., STB) can comprise or be associated with the schedule manager component. The schedule manager component can facilitate generating and presenting the user interface to a user via a presentation component (e.g., television) associated with the device or another device (e.g., a computer, a smart phone, or an electronic pad or tablet). In some implementations, the user interface can be presented on a display (e.g., a display screen) and/or control panel of the device, or on a display (e.g., a display screen, a touch screen) and/or control panel of the presentation component associated with (e.g., connected to) the device. For instance, the schedule manager component can employ an application (e.g., a schedule application) that can be employed to facilitate generating the user interface. In other implementations, the user interface can be presented via a website that can be accessed using a web browser. A user can manipulate buttons, controls, and/or commands on the user interface to enter the input information, which can be received by the schedule manager component.

At 604, a content schedule can be generated via a device (e.g., STB or STU), based at least in part on the input information, wherein the content schedule can comprise schedule information related to scheduling the respective items of content for presentation at the respective times. In response to and based at least in part on the input information, the schedule manager component can generate the content schedule, which can comprise the schedule information. In some implementations, the content schedule can be included with or associated with an electronic content guide.

At 606, the content schedule can be executed (e.g., by the device) to facilitate presentation of the respective items of content by the presentation component associated with the device at the respective times, based at least in part on the schedule information in the content schedule. The schedule manager component of or associated with the device can execute the content schedule to facilitate presentation of the respective items of content by the presentation component associated with the device at the respective times, based at least in part on the schedule information.

FIG. 7 presents a flow chart of another example method 700 that can be employed to schedule respective items of content for presentation at respective times, in accordance with various aspects and embodiments of the disclosed subject matter. The method 700 can be employed by, for example, a schedule manager component associated with or in (e.g., connected to) a communication network.

At 702, a user interface for use in scheduling presentation of content can be generated. A device (e.g., STB) can comprise or be associated with the schedule manager component. The schedule manager component can facilitate generating the user interface. In some implementations, the schedule manager component can generate and/or utilize a schedule application that can be employed to facilitate generating the user interface.

At 704, the user interface can be presented. The schedule manager component can facilitate presenting the user interface to the user. The user interface can be presented to the user via the device, a presentation component (e.g., television) associated with the device, or another device (e.g., computer, smart phone, electronic tablet). In some implementations, the user interface can be presented on a display (e.g., a display screen) and/or control panel of the device, or on a display (e.g., a display screen, a touch screen) and/or control panel of the presentation component (e.g., television) associated with (e.g., connected to) the device. In other implementations, the user interface can be presented via a website that can be accessed using a web browser (e.g., using an IPTV, a computer, a smart phone, or an electronic tablet).

At 706, first schedule-related information related to scheduling of first content for presentation at a first time can be received via the user interface. The user can manipulate buttons, controls, and/or commands on the user interface to enter schedule-related information, comprising the first schedule-related information, which can be received by the schedule manager component. The first schedule-related information can comprise, for example, the name of the first content, the first time (e.g., a first date and time) that the first content is to be presented, a source of the content, a date and time that the first content is first available to be accessed, and/or other information relating to the first content. The source of the content can be, for example, an application, a television channel via a cable television service, a television channel via a satellite television service, a television channel via a terrestrial television service, a video-on-demand service, a pay-per-view service, a website, a radio channel via a cable television service, a radio channel via a satellite television service, a radio channel via a terrestrial radio service, or another device (e.g., a computer, a smart phone, an electronic pad or tablet, an electronic gaming device) associated with the device.

The date and time that the first content is to be presented can be the same as or different than the date and time that the first content is first available to be accessed. For example, the first content (e.g., a television program) first can be available to be accessed at a first date and time (e.g., the date and time the television program is regularly scheduled for presentation by the television channel), whereas the user may desire to have the first content presented on the presentation component at a second (e.g., a later) date and time. The device can access, record (e.g., store) the first content on the date and time the first content is first available to be accessed, or can access, record the first content on another date and time after the date and time the first content is first available to be accessed, but before the date and time the first content is to be presented, or can access and stream the first content at the date and time the first content is to be presented.

At 708, a content schedule can be generated to schedule the first content for presentation at the first time, based at least in part on (e.g., in response to) the first schedule-related information. The schedule manager component can generate a content schedule and, in the content schedule, can schedule the first content for presentation at the first time, based at least in part on the first schedule-related information. At least a portion of the first schedule-related information (e.g., name of the first content, the first time the first content is to be presented, the length (e.g., start time, end time) of presentation of the first content, the source of the first content) can be displayed in the content schedule on the user interface. In some implementations, the content schedule can be included with or associated with an electronic content guide.

At 710, second schedule-related information related to scheduling of second content for presentation at a second time can be received via the user interface. The user can use (e.g., manipulate buttons and controls on) the user interface to input the second schedule-related information. The schedule manager component can receive the second schedule-related information via the user interface.

At 712, the second content can be scheduled, in the content schedule, for presentation at the second time, based at least in part on the second schedule-related information. The schedule manager component can modify or update the content schedule to schedule the second content for presentation at the second time, based at least in part on the second schedule-related information. At least a portion of the second schedule-related information (e.g., name of the second content, the second time the second content is to be presented, the length (e.g., start time, end time) of presentation of the second content, the source of the second content) can be displayed in the content schedule via the user interface.

It is to be appreciated and understood that, while the method 700 only describes the scheduling of the first content and second content, the disclosed subject matter is not so limited. For example, as desired, employing the method 700, other content (e.g., third content, fourth content, . . . ) can be scheduled (e.g., via the schedule manager component and user interface) for presentation in a similar manner as the first content and second content is scheduled using the method 700.

At 714, The content schedule can be stored. The schedule manager component can store the content schedule (e.g., information of the content schedule) in a data store of or associated with the device.

At 716, at the first time, the content schedule can be executed with regard to the first content to facilitate presentation of the first content. The schedule manager component can access the content schedule from the data store. At the first time (e.g., first date and time), the schedule manager component can execute the content schedule (e.g., execute the first item relating to the first content in the content schedule) to facilitate presenting the first content.

At 718, the first content can be accessed (e.g., from the first source). Prior to or at the first time, the schedule manager component can access the first content. For example, the schedule manager component can access the first content from the first source prior to the first time, and can store the first content in the data store, wherein the schedule manager component can access the first content in the data store at the first time, or, alternatively, the schedule manager component can access the first content from the first source at the first time.

At 720, the first content can be presented at the first time. The schedule manager component can facilitate communication of the first content from the device to the presentation component at the first time to facilitate presentation of the first content by the presentation component at the first time.

At 722, at the second time, the content schedule can be executed with regard to the second content to facilitate presentation of the second content. At the second time (e.g., second date and time), the schedule manager component can execute the content schedule (e.g., execute the second item relating to the second content in the content schedule) to facilitate presenting the second content.

At 724, the second content can be accessed (e.g., from a second source). Prior to or at the second time, the schedule manager component can access the second content. For instance, the schedule manager component can access the second content from the second source prior to the second time, and can store the second content in the data store until the second time, wherein the schedule manager component can access the second content in the data store at the second time. Alternatively, the schedule manager component can access the second content from the second source at the second time.

At 726, the second content can be presented at the second time. The schedule manager component can facilitate communication of the second content from the device to the presentation component at the second time to facilitate presentation of the second content by the presentation component at the second time.

Figure 8:
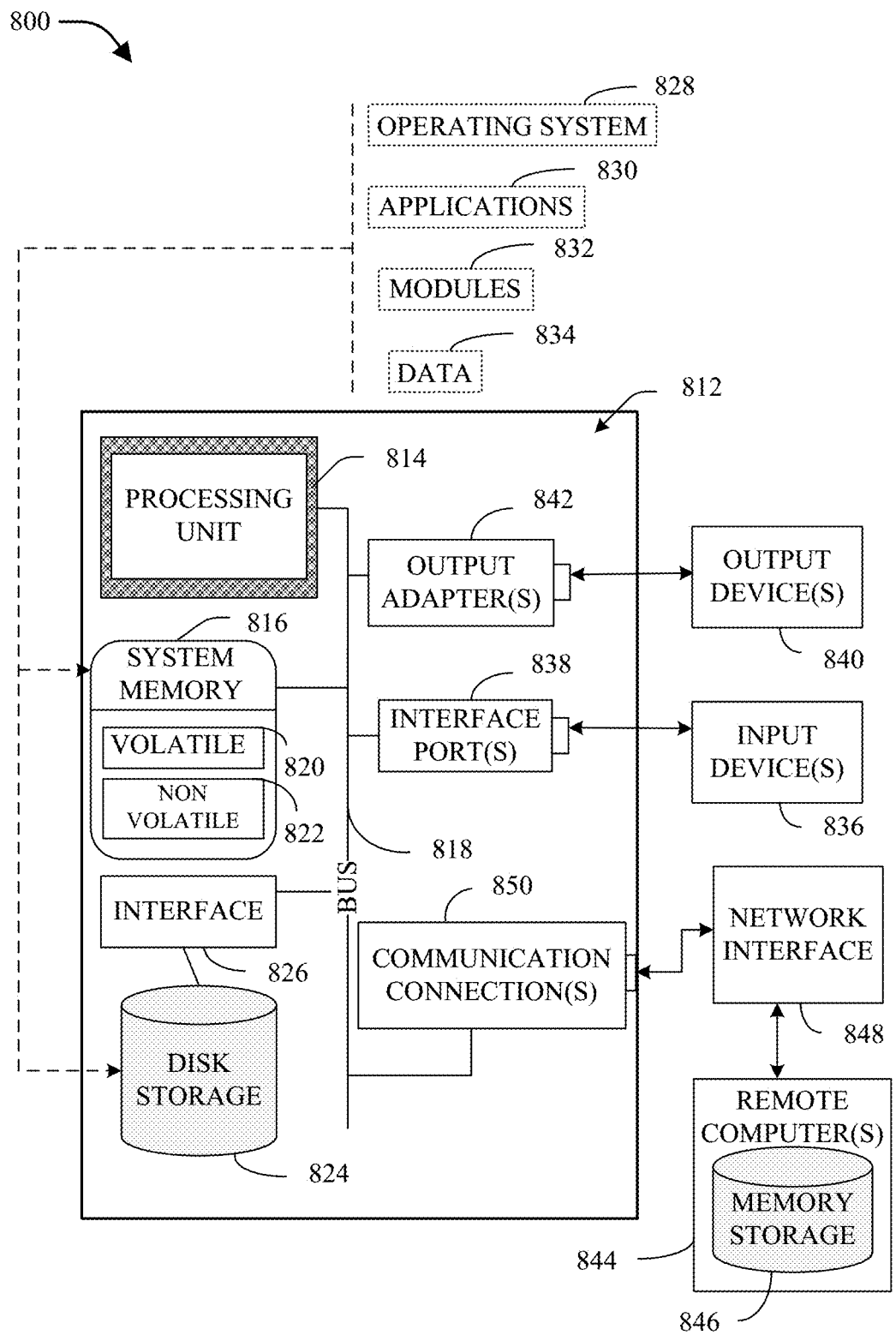
FIG. 8 is a schematic block diagram illustrating a suitable operating environment.
Figure 9:
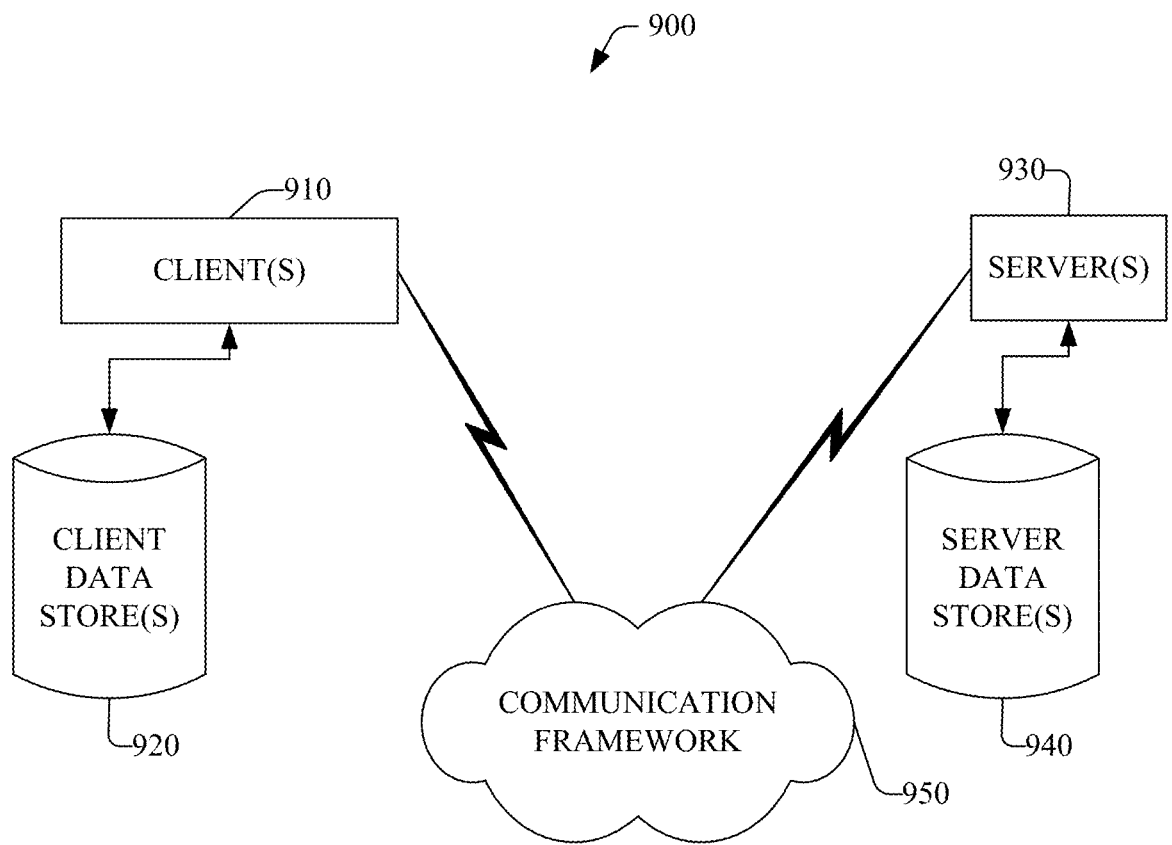
FIG. 9 is a schematic block diagram of a sample-computing environment.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., mobile phone, electronic tablets or pads, laptop computers, PDAs, . . . ), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 8, a suitable environment 800 for implementing various aspects of this disclosure includes a computer 812. The computer 812 includes a processing unit 814, a system memory 816, and a system bus 818. It is to be appreciated that the computer 812 can be used in connection with implementing one or more of the systems, components, or methods shown and described in connection with FIGS. 1-11, or otherwise described herein. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 also includes removable/non-removable, volatile/non-volatile computer storage media. FIG. 8 illustrates, for example, a disk storage 824. Disk storage 824 includes, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used, such as interface 826.

FIG. 8 also depicts software that acts as an intermediary between users and the basic computer resources described in the suitable operating environment 800. Such software includes, for example, an operating system 828. Operating system 828, which can be stored on disk storage 824, acts to control and allocate resources of the computer system 812. System applications 830 take advantage of the management of resources by operating system 828 through program modules 832 and program data 834 stored, e.g., in system memory 816 or on disk storage 824. It is to be appreciated that this disclosure can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 (e.g., computing system) with which the subject matter of this disclosure can interact. The system 900 includes one or more client(s) 910. The client(s) 910 can be hardware and/or software (e.g., threads, processes, computing devices). The system 900 also includes one or more server(s) 930. Thus, system 900 can correspond to a two-tier client server model or a multi-tier model (e.g., client, middle tier server, data server), amongst other models. The server(s) 930 can also be hardware and/or software (e.g., threads, processes, computing devices). The servers 930 can house threads to perform transformations by employing this disclosure, for example. One possible communication between a client 910 and a server 930 may be in the form of a data packet transmitted between two or more computer processes.

The system 900 includes a communication framework 950 that can be employed to facilitate communications between the client(s) 910 and the server(s) 930. The client(s) 910 are operatively connected to one or more client data store(s) 920 that can be employed to store information local to the client(s) 910. Similarly, the server(s) 930 are operatively connected to one or more server data store(s) 940 that can be employed to store information local to the servers 930.

It is to be noted that aspects, features, and/or advantages of the disclosed subject matter can be exploited in substantially any wireless telecommunication or radio technology, e.g., wi-fi; bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, communication device, schedule manager component, remote control component, interface component, interface screen, communication network, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

generating, by a system comprising a processor, a schedule that comprises information relating to scheduling first media content for a first presentation at a first time and second media content for a second presentation at a second time, via a presentation device, based on schedule-related information received via an interface of the system, wherein the schedule-related information indicates that the first media content is to be presented at the first time and the second media content is to be presented at a third time that occurs after the first time and before the second time, and wherein the first media content comprises a presentation length that spans from the first time to the second time;

determining, by the system, that there is a conflict between scheduling of the first media content and the second media content, in response to determining that the third time occurs before the second time;

to facilitate the generating of the schedule, resolving, by the system, the conflict, based on scheduling the second media content to be presented at the second time;

generating, by the system, a message template for a text message, wherein the message template comprises respective information fields usable to insert respective items of the schedule-related information relating to the first media content, and wherein the respective information fields comprise an information field;

communicating, by the system, the message template to a device via a network device of a communication network, wherein, using the message template, a first item of the schedule-related information is inserted into the information field of the message template to facilitate scheduling of the first media content for the first presentation at the first time, by the device, via the text message comprising the message template;

in response to receiving the text message having the message template with the first item of the schedule-related information, determining, by the system, that a second item of the schedule-related information relating to the first media content is missing from the text message based on a parsing of the text message;

in response to determining that the second item of the schedule-related information is missing, determining, by the system, the second item of the schedule-related information relating to the first media content based on a first search of content-related data associated with a data source device, wherein the first search includes the first item of the schedule-related information in a search query associated with the first search;

with regard to a program that is presented on a reoccurring basis for which scheduling of the program is requested on the reoccurring basis, via a third search, searching, by the system, for a first presentation time of a third presentation of third media content of the program during a second time period that occurs after a first time period, wherein the first presentation time is not available via a second search for the first presentation time during the first time period and is available via the third search for the first presentation time during the second time period that occurs before the first presentation time, wherein the third search is scheduled to be performed at a time subsequent to the second search in response to the first presentation time not being available during the first time period, wherein the first media content is part of the program and is a different episode of the program than the third media content, wherein the first presentation time is determined to be at a fourth time, and wherein the schedule comprises additional information relating to scheduling the third media content for the third presentation at the fourth time;

in response to determining, based on a change in a programming time schedule, that a second presentation time of a fourth presentation of fourth media content that is a subsequent episode of the program is changed from a regular periodic basis associated with the first media content and the third media content to a different regular periodic basis associated with a fifth time, modifying, by the system, the schedule to schedule the fourth presentation of the fourth media content at the fifth time; and executing, by the system, the schedule to facilitate the first presentation of the first media content at the first time, the second presentation of the second media content at the second time, the third presentation of the third media content at the fourth time, and the fourth presentation of the fourth media content at the fifth time via the presentation device.

2. The method of claim 1, further comprising:
receiving, by the system, the schedule-related information relating to the scheduling of the first media content for the first presentation at the first time and the second media content for the second presentation at the second time.

3. The method of claim 1, further comprising:
receiving, by the system, the text message from the device via the network device of the communication network, wherein the text message comprises at least a portion of the schedule-related information, and wherein the text message is a short message service message or a multimedia messaging service message;

parsing, by the system, the text message to identify the portion of the schedule-related information relating to the first media content and the first time, wherein the portion of the schedule-related information comprises the first item of the schedule-related information; and scheduling, by the system, the first presentation of the first media content at the first time in the schedule based on a result of the parsing.

4. The method of claim 1, further comprising:
receiving, by the system, the first media content from a first source device;
receiving, by the system, the second media content from a second source device; and
in response to the executing of the schedule, communicating, by the system, the first media content to the presentation device at the first time, and communicating, by the system, the second media content to the presentation device at the second time.

5. The method of claim 4, wherein the first source device is associated with a first member of a group comprising an application, a cable television service, a satellite television service, a media streaming service, a media-on-demand service, a media content provider associated with an Internet, a media content provider associated with an intranet, a terrestrial television service, and a terrestrial radio service, and wherein the second source device is associated with a second member of the group.

6. The method of claim 4, further comprising:
switching, by the system, to a first communication channel associated with the first source device at the first time based on the executing of the schedule; and
switching, by the system, to a second communication channel associated with the second source device at the second time based on the executing of the schedule.

7. The method of claim 1, further comprising:
receiving, by the system, second schedule-related information via the interface, wherein the second schedule-related information indicates the first presentation of at least the first media content relating to at least the program is to occur at the first time and additional presentations of additional items of media content relating to at least the program are to be presented at respective other times on the reoccurring basis,
wherein the additional presentations of the additional items of media content comprise the third presentation of the third media content at the fourth time,
wherein the generating the schedule comprises generating the schedule that schedules the additional presentations of the additional items of media content at the respective other times on the reoccurring basis, and
wherein the executing the schedule comprises executing the schedule to facilitate the additional presentations of the additional items of media content at the respective other times on the reoccurring basis, via the presentation device.

8. The method of claim 1, further comprising:
generating, by the system, the interface comprising a first interface screen comprising an electronic calendar that presents days of a defined time period, a second interface screen that comprises defined intraday incremental time periods, and a third interface screen that comprises media-content information relating to items of media content comprising at least the first media content; and initiating, by the system, presenting the first interface screen to facilitate selection of a day of the days via the first interface screen.

9. The method of claim 8, wherein the schedule-related information comprises first selection information indicating the selection of the day, and wherein the method further comprises:
   initiating, by the system, transitioning from presenting the first interface screen to presenting the second interface screen, in response to the selection information, wherein the schedule-related information comprises second selection information indicating selection of a time of the day, and wherein the first time is the time of the day; and
   initiating, by the system, transitioning from presenting the second interface screen to presenting the third interface screen, in response to the second selection information, wherein the schedule-related information comprises third selection information indicating selection of the first media content, and wherein the generating the schedule comprises generating the schedule to schedule the first media content at the first time in response to receiving the third selection information.

10. The method of claim 1, further comprising:
   selecting, by the system, a default communication channel for presentation of default media content at a sixth time, in response to no selection of media content for the sixth time being received via the interface.

11. A system, comprising:
   a processor; and
   a memory that stores executable instructions that, when executed by the processor, facilitate performance of operations, comprising:
      generating a schedule that schedules a first media item for a first presentation at a first time and a second media item for a second presentation at a second time, via a presentation component, based on schedule-related information received via an interface component, wherein the schedule-related information directs that the first media item is to be presented at the first time and the second media item is to be presented at a third time that occurs after the first time and before the second time, and wherein the first media item comprises a presentation length that spans from the first time to the second time;
      determining that there is a conflict between scheduling of the first media item and the second media item in the schedule based on the presentation length of the first media item being determined to span to the second time and the third time being determined to occur before the second time;
      to resolve the conflict and facilitate the generating of the schedule, determining that the second media item is to be presented at the second time instead of the third time based on determining that presentation of the first media item will end at the second time;
      creating a text message template for a text message, wherein the text message template comprises respective information fields usable to insert respective items of the schedule-related information relating to the first media item, and wherein the respective information fields comprise an information field;
      transmitting the text message template to a device via a network device of a communication network, wherein a first item of the schedule-related information relating to the first media item is inserted into the information field of the text message template to facilitate scheduling the first media item, by the device, via the text message using the text message template in the text message;
      in response to receiving the text message, including the text message template with the first item of the schedule-related information in the information field, determining that a second item of the schedule-related information relating to the first media item is not included in the text message based on a parsing of the text message;
      in response to determining that the second item of the schedule-related information is not included in the text message, determining the second item of the schedule-related information relating to the first media item based on a first search of content-related data associated with a data source device, wherein the first search comprises the first item of the schedule-related information as part of a search query associated with the first search;
      with regard to a media program that is presented on a reoccurring time basis for which scheduling of the media program is requested on the reoccurring time basis, searching, via a third search, for a first presentation time of a third presentation of a third media item of the media program during a second time period that occurs after a first time period, wherein the first presentation time is not available via a second search for the first presentation time during the first time period and is available via the third search for the first presentation time during the second time period that occurs before the first presentation time, wherein the third search is scheduled to be performed at a time that occurs after the second search in response to the first presentation time not being available during the first time period, wherein the first media item is a media item of the program and is a different episode of the media program than the third media item, wherein the first presentation time is determined to be at a fourth time, and wherein the schedule schedules the third media item for the third presentation at the fourth time;
      in response to detecting, based on a modification of a programming schedule, that a second presentation time of a fourth presentation of a fourth media item that is a subsequent episode of the media program is modified from a first regular periodic basis associated with the first media item and the third media item to a second regular periodic basis associated with a fifth time, adjusting the schedule to schedule the fourth presentation of the fourth media item at the fifth time; and
      executing the schedule to facilitate the first presentation of the first media item at the first time, the second presentation of the second media item at the second time, the third presentation of the third media item at the fourth time, and the fourth presentation of the fourth media item at the fifth time via the presentation component.

12. The system of claim 11, wherein the operations further comprise:
   receiving the schedule-related information via the interface component.

13. The system of claim 11, wherein the operations further comprise:
   receiving the first media item from a first source device;
   receiving the second media item from a second source device;

transmitting the first media item to the presentation component at the first time based on the schedule; and
transmitting the second media item to the presentation component at the second time based on the schedule.

14. The system of claim 11, wherein the first source device is associated with a first member of a group comprising an application, a cable television service, a satellite television service, a media streaming service, a media-on-demand service, a content provider associated with an Internet, a content provider associated with an intranet, a terrestrial television service, and a terrestrial radio service, and wherein the second source device is associated with a second member of the group.

15. The system of claim 11, wherein the operations further comprise:
in response to the executing of the schedule:
connecting to a first communication channel associated with the first source device at the first time; and
connecting to a second communication channel associated with the second source device at the second time.

16. The system of claim 11, wherein the schedule-related information is first schedule-related information, and wherein the operations further comprise:
receiving second schedule-related information via the interface, wherein the second schedule-related information indicates that respective media items relating to the media program are to be presented at respective times based on a reoccurring schedule for the media program; and
determining the respective times that the respective media items relating to the media program are scheduled to be provided by a particular source device associated with a media provider that provides the media program,
wherein the respective media items comprise the third media item, and the respective times comprise the fourth time,
wherein, in response to the determining the respective times, the generating the schedule comprises generating the schedule that schedules the respective media items to be presented at the respective times, and
wherein the executing the schedule comprises executing the schedule to facilitate the presentation of the respective media items at the respective times.

17. The system of claim 11, wherein the operations further comprise:
generating a first interface of the interface component, wherein the first interface comprises an electronic calendar that presents days of a defined time period to facilitate selection of a day of the defined time period;
generating a second interface of the interface component, wherein the second interface presents defined intraday incremental time periods of the day to facilitate selection of an incremental time period of the defined intraday incremental time periods; and
generating a third interface of the interface component, wherein the third interface comprises media-item-related information relating to media items comprising the first media item to facilitate selection of the first media item at the first time that is associated with the incremental time period.

18. The system of claim 11, wherein the schedule is executed within a set-top box device.

19. A non-transitory machine-readable storage medium, comprising executable instructions that, when executed by a processor, facilitate performance of operations, comprising:

creating a schedule that schedules first media content for a first presentation at a first time and second media content for a second presentation at a second time, via a presentation device, based on schedule-related information received via a user interface, wherein the schedule-related information indicates that the first media content is to be presented at the first time and the second media content is to be presented at a third time that occurs after the first time and before the second time, and wherein the first media content has a presentation length that spans from the first time to the second time;
determining that there is a conflict between scheduling of the first media content and the second media content based on a determination that the third time occurs before the second time;
to mitigate the conflict and facilitate the creating of the schedule, determining that the second media content is to be presented at the second time instead of the third time based on a determination that presentation of the first media content will end at the second time;
creating a message template for a text message, wherein the message template comprises respective information fields usable to insert respective items of the schedule-related information relating to the first media content, and wherein the respective information fields comprise an information field;
communicating the message template to a device via a network device of a communication network, wherein a first item of the schedule-related information relating to the first media content is inserted into the information field of the message template to facilitate scheduling the first media content, by the device, using the message template in the text message;
in response to receiving the text message, including the message template with the first item of the schedule-related information, determining, based on a parsing of the text message, that a second item of the schedule-related information relating to the first media content is missing from the text message;
in response to determining that the second item of the schedule-related information is missing, determining the second item of the schedule-related information relating to the first media content based on a first search of content-related information associated with an information source device, wherein the first search is based on a search query comprising the first item of the schedule-related information;
for a program that is presented on a reoccurring basis for which scheduling of the program is requested on the reoccurring basis, searching, via a third search, for a first presentation time of a third presentation of third media content of the program during a second time period that occurs after a first time period, wherein the first presentation time is not available via a second search for the first presentation time during the first time period and is available via the third search for the first presentation time during the second time period that occurs before the first presentation time, wherein the third search is performed at a time subsequent to the second search in response to the first presentation time not being available during the first time period, wherein the first media content is part of the program and is a different episode of the program than the third media content, wherein the first presentation time is determined to be at a fourth time, and wherein the schedule schedules the third media content for the third presentation at the fourth time;

in response to determining, based on an adjustment to a programming time schedule, that a second presentation time of a fourth presentation of fourth media content that is a subsequent episode of the program is changed from a regular periodic basis associated with the first media content and the third media content to a different regular periodic basis associated with a fifth time, modifying the schedule to schedule the fourth presentation of the fourth media content at the fifth time; and implementing the schedule to facilitate the first presentation of the first media content at the first time, the second presentation of the second media content at the second time, and the third presentation of the third media content at the third time via the presentation device.

20. The non-transitory machine-readable storage medium of claim 19, wherein the operations further comprise:

receiving the first media content from a first media source device;

receiving the second media content from a second media source device;

communicating the first media content to the presentation device at the first time, based on the schedule, to facilitate the first presentation of the first media content on the presentation device at the first time; and communicating the second media content to the presentation device at the second time, based on the schedule, to facilitate the second presentation of the second media content on the presentation device at the second time.

* * * * *